(12) United States Patent
Hayashi et al.

(10) Patent No.: US 9,116,286 B2
(45) Date of Patent: Aug. 25, 2015

(54) INTERNAL FOCUS LENS

(75) Inventors: Toshihide Hayashi, Saitama (JP); Naoki Miyagawa, Kanagawa (JP)

(73) Assignees: SONY CORPORATION, Tokyo (JP); TAMRON CO., LTD., Saitama-shi (JP)

( * ) Notice: Subject to any disclaimer, the term of this patent is extended or adjusted under 35 U.S.C. 154(b) by 551 days.

(21) Appl. No.: 13/466,423

(22) Filed: May 8, 2012

(65) Prior Publication Data

US 2012/0293869 A1    Nov. 22, 2012

(30) Foreign Application Priority Data

May 20, 2011    (JP) ................................. 2011-114189

(51) Int. Cl.
*G02B 27/64* (2006.01)
*G02B 7/08* (2006.01)
*G02B 9/24* (2006.01)

(52) U.S. Cl.
CPC .. *G02B 7/08* (2013.01); *G02B 9/24* (2013.01); *G02B 27/646* (2013.01)

(58) Field of Classification Search
CPC ... G03B 2205/00–2205/0092; H04N 5/23248; G02B 27/64–27/648; G02B 15/15; G02B 15/173; G02B 15/24; G02B 15/28
USPC ................. 359/554–557, 362–435, 642–797; 396/55; 348/208.11
See application file for complete search history.

(56) References Cited

U.S. PATENT DOCUMENTS

| | | | | |
|---|---|---|---|---|
| 5,040,881 | A * | 8/1991 | Tsuji .............................. | 359/557 |
| 5,502,594 | A | 3/1996 | Suzuki et al. | |
| 5,677,792 | A * | 10/1997 | Hamano ....................... | 359/557 |
| 5,745,306 | A | 4/1998 | Sato | |
| 6,081,390 | A * | 6/2000 | Konno .......................... | 359/689 |
| 6,115,188 | A | 9/2000 | Nishio et al. | |
| 6,226,122 | B1 * | 5/2001 | Sugawara ..................... | 359/557 |
| 6,384,975 | B1 | 5/2002 | Hayakawa | |
| 6,493,142 | B1 * | 12/2002 | Itoh .............................. | 359/557 |
| 6,563,642 | B2 * | 5/2003 | Sugawara ..................... | 359/557 |

(Continued)

FOREIGN PATENT DOCUMENTS

| | | |
|---|---|---|
| CN | 1837886 A | 9/2006 |
| CN | 1869760 A | 11/2006 |

(Continued)

OTHER PUBLICATIONS

"Paraxial Ray Trace for a Lens System" http://old.lightmachinery.com/paraxial-ray-trace.php; with calculations.*

(Continued)

*Primary Examiner* — Stephone B Allen
*Assistant Examiner* — Jeffrey Madonna
(74) *Attorney, Agent, or Firm* — Foley & Lardner LLP

(57) ABSTRACT

An internal focus lens includes sequentially from an object side, a first lens group having a positive refractive power; a second lens group having a negative refractive power; and a third lens group having a positive refractive power. The first lens group includes an anti-vibration lens formed by a negative lens that is moved in an orthogonal direction with respect to an optical axis to correct image blur consequent to optical system vibration, and further includes an aperture stop disposed farther on an image side of the first lens group than the anti-vibration lens. The second lens group is moved along the optical axis to perform focusing.

4 Claims, 21 Drawing Sheets

(56) References Cited

U.S. PATENT DOCUMENTS

| | | | |
|---|---|---|---|
| 7,583,441 B2* | 9/2009 | Taki | 359/557 |
| 7,965,454 B2* | 6/2011 | Tanaka et al. | 359/754 |
| 2005/0063072 A1* | 3/2005 | Harada | 359/772 |
| 2006/0215279 A1 | 9/2006 | Shibayama | |
| 2007/0014032 A1 | 1/2007 | Otake | |
| 2007/0183042 A1* | 8/2007 | Mizuguchi | 359/557 |
| 2010/0284092 A1 | 11/2010 | Hayakawa | |

FOREIGN PATENT DOCUMENTS

| | | |
|---|---|---|
| JP | 8-304698 A | 11/1996 |
| JP | 2000-284171 A | 10/2000 |
| JP | 3541283 B2 | 7/2004 |
| JP | 4272725 B2 | 6/2009 |
| JP | 2010-152247 A | 7/2010 |
| JP | 2010-271458 A | 12/2010 |
| WO | WO 2009/096536 A1 | 8/2009 |

OTHER PUBLICATIONS

Chinese Office Action and English translation dated Feb. 14, 2014 (8 pgs.).

Japanese Office Action and partial English-language translation dated Jun. 24, 2014, 11 pgs.

* cited by examiner

FIG.18 THIRD EMBODIMENT FOCUS AT MINIMUM OBJECT DISTANCE

INTERNAL FOCUS LENS

BACKGROUND OF THE INVENTION

1. Field of the Invention

The present invention relates to an internal focus lens that suitable for photographic cameras, video cameras, etc. and has an anti-vibration function.

2. Description of the Related Art

A large number of internal focus lenses that can be used in photographic cameras and video cameras and that have an anti-vibration function of correcting image blur consequent to vibrations, such as hand-shake, have been proposed (see, for example, Japanese Patent Nos. 3541283 and 4272725).

The internal focus lens recited in Japanese Patent No. 3541283 includes sequentially from an object side, a first lens group having a positive refractive power, a second lens group having a negative refractive power, and a third lens group having a positive refractive power, where the second lens group is moved to perform focusing and the third lens group is moved orthogonally with respect to the optical axis to correct image blur.

The internal focus lens recited in Japanese Patent No. 4272725 includes sequentially from the object side, a first lens group having a positive refractive power, a second lens group having a negative refractive power, and a third lens group having a positive refractive power, where the second lens group is moved to perform focusing and a portion of the lenses included in the third lens group are moved orthogonally with respect to the optical axis to correct image blur.

In optical systems having the conventional anti-vibration function, the lens group (anti-vibration group) responsible for image blur correction is often configured by multiple lenses. In both of the internal focus lenses disclosed in Japanese Patent Nos. 3541283 and 4272725, the anti-vibration group is configured by multiple lenses and thus, is heavy. Consequently, since the actuator also has to be larger in order to drive the anti-vibration group, the size of the lens barrel supporting the lens also unavoidably becomes larger. Further, since image blur correction coefficients in either optical system are small, the anti-vibration group has to be moved over a longer distance to correct image blur and therefore, with respect to a dimension along the diameter of the optical system, a large space is required, arising in a problem that the size of the lens barrel supporting the optical system increases.

SUMMARY OF THE INVENTION

It is an object of the present invention to at least solve the above problems in the conventional technologies.

An internal focus lens according to one aspect of the present invention includes sequentially from an object side, a first lens group having a positive refractive power; a second lens group having a negative refractive power; and a third lens group having a positive refractive power. The first lens group includes an anti-vibration lens formed by a negative lens that is moved in an orthogonal direction with respect to an optical axis to correct image blur consequent to optical system vibration, and further includes an aperture stop disposed farther on an image side of the first lens group than the anti-vibration lens. The second lens group is moved along the optical axis to perform focusing.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
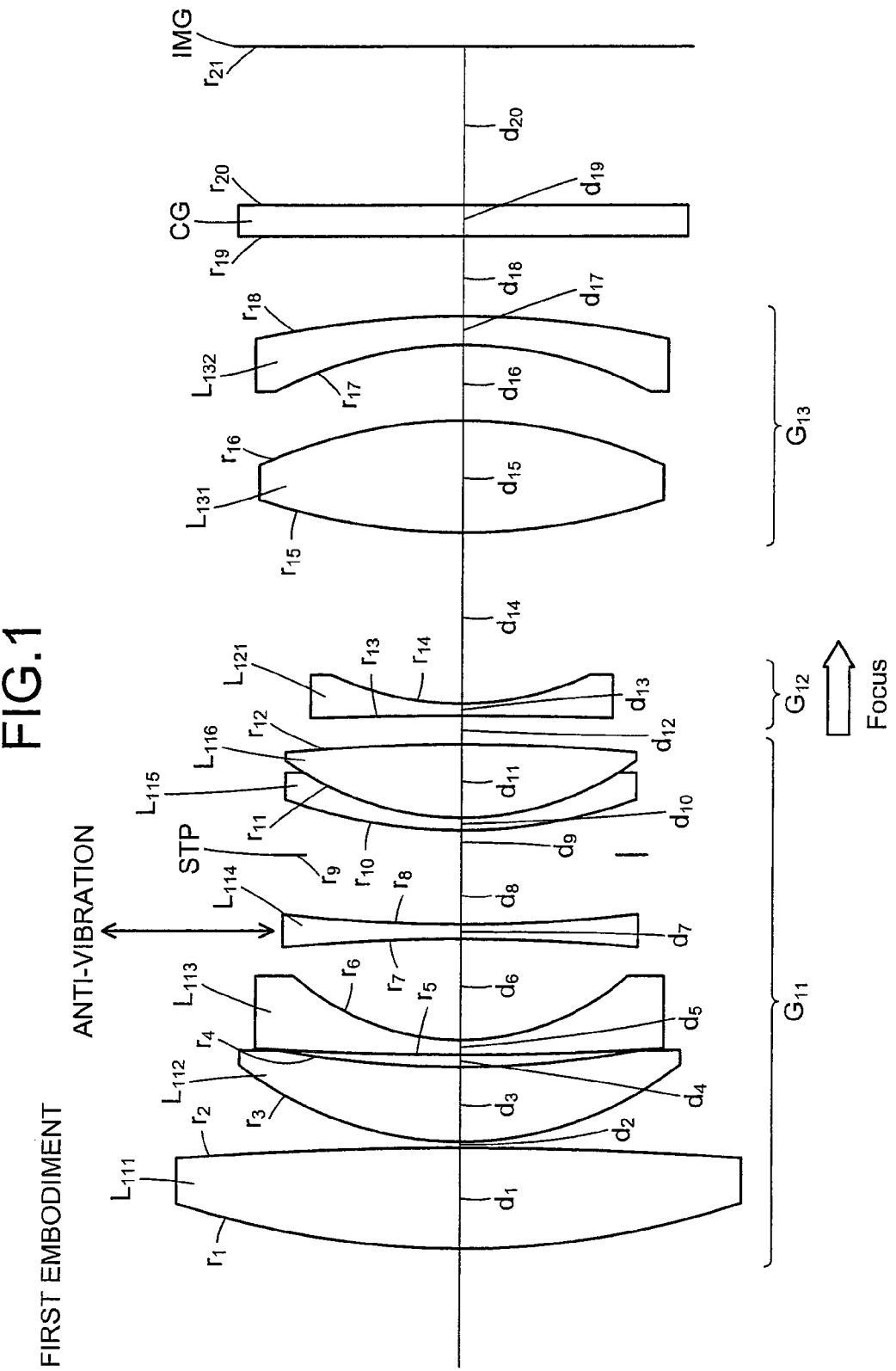
FIG. 1 is a cross sectional view (along an optical axis) of an internal focus lens according to a first embodiment.

Referring to the accompanying drawings, exemplary embodiments according to the present invention are explained in detail below.

An internal focus lens according to the present invention includes sequentially from an object side, a first lens group having a positive refractive power, a second lens group having a negative refractive power, and a third lens group having a positive refractive power.

The first lens group has a Sonnar-type configuration. With a Sonnar-type configuration, the total length of the optical system can be reduced to a greater extent than by a retrofocus configuration. Further, since the symmetry of the optical system with respect to the aperture stop is maintained compared to a retrofocus configuration, favorable aberration correction is possible with a Sonnar-type configuration. In particular, a Sonnar-type configuration offers an advantage in that since favorable aberration correction within the first lens group becomes possible, the configurations of the subsequent second lens group and third lens group can be simplified. In a Sonnar-type optical system, although back focus tends to become shorter, by suitably selecting a refractive power arrangement of the lenses configuring the second lens group and the third lens group, the back focus can be set to a suitable distance.

The first lens group includes an anti-vibration lens formed by a single negative lens, and an aperture stop disposed farther on an image side of the first lens group than the anti-vibration lens. The anti-vibration lens is moved in a direction orthogonal to the optical axis (deviating from center) whereby image blur caused by optical system vibration consequent to, for example, hand-shake is corrected. In the present invention, the anti-vibration lens is disposed in the first lens group, thereby enabling magnification by the anti-vibration lens to be increased. As a result, the distance that the anti-vibration lens moves during vibration correction can be reduced. Consequently, a dimension along the diameter of the optical system can be reduced in size. Further, by configuring the anti-vibration lens by a single negative lens, the weight of this moving lens can be reduced. Consequently, a smaller actuator can be adopted to drive the anti-vibration lens, enabling increases in the dimension along the diameter to be suppressed. By disposing the aperture stop farther on the image side than the anti-vibration lens, a rear lens diameter can be reduced.

On the other hand, if the anti-vibration lens is disposed in the second lens group and the focusing lens is disposed in the first lens group, the magnification of a lens disposed farther on the image side than the focusing lens is reduced and the distance that the focusing lens moves to make focusing adjustments consequent to changes in object distance increases, resulting in a longer optical system, which is disadvantageous. Further, in this case, the focusing lens has to be disposed at a high position where light passes. Consequently, further disadvantages arise in that increases in the size and weight of the focusing lens become unavoidable. If the size and weight of the focusing lens increase, a larger actuator is required to drive the focusing lens and a larger lens barrel to support the entire optical system becomes unavoidable. If focusing is performed by a lens included among the third lens group, similar problems arise.

Thus, to avoid such problems, in the present invention, the second lens group is moved along the optical axis to perform focusing. Consequently, the magnification of a lens disposed farther on the image side than the second lens group increases, thereby enabling reduction of the distance that the second lens group moves to make focusing adjustments consequent to changes in the object distance. To facilitate reductions in the weight of the focusing lens, the second lens group is preferably configured by a single negative lens. Further, when focusing is performed by the second lens group, the anti-vibration lens is disposed at a high position where light passes in the entire optical system. Consequently, the diameter of the anti-vibration lens tends to increase. However, by reducing the refractive power of the anti-vibration lens, the curvature can also be reduced, thereby enabling weight increases consequent to increased diameter to be suppressed as far as possible and therefore, is not a problem. In the present invention, the refractive power of the anti-vibration lens is suppressed as far as possible.

Further in the present invention, various conditions are set in addition to the characteristics above to implement a smaller internal focus lens having high imaging performance.

The internal focus lens according to the present invention preferably satisfies the conditional expression below, where f is the focal length of the entire optical system, $\beta vr$ is the magnification of the anti-vibration lens, and $\beta r$ is the collective magnification of a lens group disposed farther on the image side than the lens group that includes in the anti-vibration lens.

$$65.76 < |f/((1-\beta vr) \times \beta r)| < 114.59 \quad (1)$$

Conditional expression (1) is a condition for implementing a smaller internal focus lens having an anti-vibration function. Below the lower limit of conditional expression (1), collective magnification of the lens group disposed farther on the image side than the lens group that includes the anti-vibration lens increases, whereby the back focus of the optical system increases and the overall length of the optical system increases. Above the upper limit of conditional expression (1), the distance that the anti-vibration lens moves during anti-vibration correction increases as does the optical system diameter.

If conditional expression (1) is within the following range, more favorable results can be expected.

$$73.99 < |f/((1-\beta vr) \times \beta r)| < 105.04 \quad (1)'$$

By satisfying conditional expression (1)', a smaller optical system can be implemented.

If conditional expression (1)' is within the following range, yet more favorable results can be expected.

$$82.20 < |f/((1-\beta vr) \times \beta r)| < 96.00 \quad (1)''$$

If conditional expression (1)'' is satisfied, further reduction of the size of the optical system can be realized.

The internal focus lens according to the present invention preferably satisfies the following conditional expression, where fvr is the focal length of the anti-vibration lens and f is the focal length of the entire optical system.

$$0.88 < |fvr|/f < 1.55 \quad (2)$$

Conditional expression (2) is a condition for improving imaging performance without sacrificing reductions in the size of the optical system. Below the lower limit of conditional expression (2), the refractive power of the anti-vibration lens becomes too great and aberration variations during anti-vibration correction become large. Above the upper limit of conditional expression (2), the refractive power of the anti-vibration lens becomes too weak and when anti-vibration correction is not being performed, spherical aberration from convergence excessively beyond the focal length results and field curvature from convergence excessively short of the focal distance results, both of which are difficult to correct and thus, undesirable.

If conditional expression (2) is within the following range, more favorable results can be expected.

$$0.99 < |fvr|/f < 1.42 \quad (2)'$$

By satisfying conditional expression (2)', the imaging performance of the optical system can be further improved.

If conditional expression (2)' is within the following range, yet more favorable results can be expected.

$$1.10 < |fvr|/f < 1.30 \quad (2)''$$

By satisfying conditional expression (2)'', the imaging performance of the optical system can be further improved.

The internal focus lens according to the present invention preferably satisfies the following conditional expression, where f3 is the focal length of the third lens group and f is the focal length of the entire optical system.

$$0.48 < |f3|/f < 0.86 \quad (3)$$

Conditional expression (3) is a condition for achieving reductions in the overall length of the optical system and enabling improved imaging performance to be facilitated. Below the lower limit of conditional expression (3), the refractive power of the third lens group increases, and spherical aberration and field curvature become difficult to correct. Above the upper limit of conditional expression (3), the back focus of the optical system increases and reductions in the overall length of the optical system become difficult.

If conditional expression (3) is within the following range, more favorable results can be expected.

$$0.54 < f3|/f < 0.78 \quad (3)'$$

By satisfying conditional expression (3)', reductions in the overall length of the optical system can be achieved and improved imaging performance can be facilitated.

If conditional expression (3)' is within the following range, yet more favorable results can be expected.

$$0.59 < |f3|/f < 0.72 \quad (3)''$$

By satisfying conditional expression (3)'', further reductions in the overall length of the optical system can be achieved and the imaging performance can be further improved.

As described, the internal focus lens according to the present invention reduces the weight of the anti-vibration lens that corrects image blur occurring with optical system vibration such as consequent to hand-shake and suppresses the distance that the anti-vibration lens moves during anti-vibration correction. Further, disposal of the aperture stop at a suitable position within the first lens group enables the rear lens diameter of the optical system to be reduced. Satisfaction of the conditional expressions above enables a smaller internal focus lens having high imaging performance to be implemented.

With reference to the accompanying drawings, embodiments of the internal focus lens according to the present invention will be described in detail hereinafter. Nonetheless, the present invention is not limited to the following embodiments.

FIG. 1 is a cross sectional view (along an optical axis) of the internal focus lens according to a first embodiment. The internal focus lens includes sequentially from a side (object side) nearest a non-depicted object, a first lens group $G_{11}$ having a positive refractive power, a second lens group $G_{12}$ having a negative refractive power, and a third lens group $G_{13}$ having a positive refractive power. Between the third lens group $G_{13}$ and an imaging plane IMG, a cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{11}$ includes sequentially from the object side, a positive lens $L_{111}$, a positive lens $L_{112}$, a negative lens $L_{113}$, a negative lens $L_{114}$, an aperture stop STP prescribing a given aperture, a negative lens $L_{115}$, and a positive lens $L_{116}$. The negative lens $L_{115}$ and the positive lens $L_{116}$ are cemented. The negative lens $L_{114}$ has a function as the anti-vibration lens. In other words, the negative lens $L_{114}$ is moved in a direction orthogonal to the optical axis (deviating from center) whereby image blur caused by optical system vibration consequent to, for example, hand-shake is corrected. In particular, by reducing the refractive power of the negative lens $L_{114}$, the curvature is also reduced, thereby enabling the negative lens $L_{114}$ to be thinner and lighter in weight. Disposal of the aperture stop STP farther on the imaging plane IMG side than the negative lens $L_{114}$, which is the anti-vibration lens, enables the diameter of subsequent lenses to be reduced. The lens configuration of the first lens group $G_{11}$ is maintained substantially symmetrically about the aperture stop STP.

The second lens group $G_{12}$ is configured by a negative lens $L_{121}$. The second lens group $G_{12}$ is moved along the optical axis, from the object side toward the imaging plane IMG, whereby focusing from infinity focus to focus at the minimum object distance is performed.

The third lens group $G_{13}$ includes sequentially from the object side, a positive lens $L_{131}$ and a negative lens $L_{132}$.

Here, various values related to the internal focus lens according to the first embodiment are given.

(Lens Data)

$r_1 = 56.3969$
$d_1 = 6.2609$  $nd_1 = 1.83481$  $vd_1 = 42.72$
$r_2 = -227.646$
$d_2 = 0.4$
$r_3 = 22.2275$
$d_3 = 4.5373$  $nd_2 = 1.83481$  $vd_2 = 42.72$
$r_4 = 61.9644$
$d_4 = 0.8239$
$r_5 = 213.9013$
$d_5 = 0.9$  $nd_3 = 1.72825$  $vd_3 = 28.32$
$r_6 = 15.7669$
$d_6 = 6.2945$
$r_7 = -108.362$
$d_7 = 0.8$  $nd_4 = 1.72825$  $vd_4 = 28.32$
$r_8 = 84.2155$
$d_8 = 4.4348$
$r_9 = \infty$ (aperture stop)
$d_9 = 1.5$
$r_{10} = 32.8654$
$d_{10} = 0.8$  $nd_5 = 1.84666$  $vd_5 = 23.78$
$r_{11} = 18.5472$
$d_{11} = 4.5781$  $nd_6 = 1.91082$  $vd_6 = 35.25$
$r_{12} = -110.767$
$d_{12} = D(12)$ (variable)
$r_{13} = -228.318$
$d_{13} = 0.7$  $nd_7 = 1.603$  $vd_7 = 65.44$
$r_{14} = 18.6759$
$d_{14} = D(14)$ (variable)
$r_{15} = 39.4179$
$d_{15} = 7$  $nd_8 = 1.72916$  $vd_8 = 54.67$
$r_{16} = -29.8753$
$d_{16} = 4.6748$
$r_{17} = -25.5175$
$d_{17} = 1.8$  $nd_9 = 1.80809$  $vd_9 = 22.76$
$r_{18} = -61.8081$
$d_{18} = 5$
$r_{19} = \infty$ -continued

| | | |
|---|---|---|
| $d_{19} = 2$ | $nd_{10} = 1.5168$ | $vd_{10} = 64.2$ |
| $r_{20} = \infty$ | | |
| $d_{20} = 9.8561$ | | |
| $r_{21} = \infty$ (imaging plane) | | |

(Values for focusing states)

| | Infinity | 0.025x | Min. Object Dist. (0.141x) |
|---|---|---|---|
| D(12) | 1.804 | 2.598 | 6.351 |
| D(14) | 10.836 | 10.042 | 6.289 |
| image height(Y) | 14.20 | 14.20 | 14.20 | f (focal length of entire optical system) = 51.50
Fno = 1.84
ω (half-angle) = 15.42
βvr (magnification of negative lens L114 (anti-vibration lens)) = 41.20
βr (collective magnification of second lens group $G_{12}$ and third lens group $G_{13}$) = 0.01
fvr (focal length of negative lens $L_{114}$ (anti-vibration lens)) = −64.96
f3 (focal length of third lens group $G_{13}$) = 36.75
(Values related to conditional expression (1)) |f′/((1 − βvr) × βr)| = 95.49
(Values related to conditional expression (2)) |fvr|/f = 1.26
(Values related to conditional expression (3)) |f3|/f = 0.71

Figure 2:
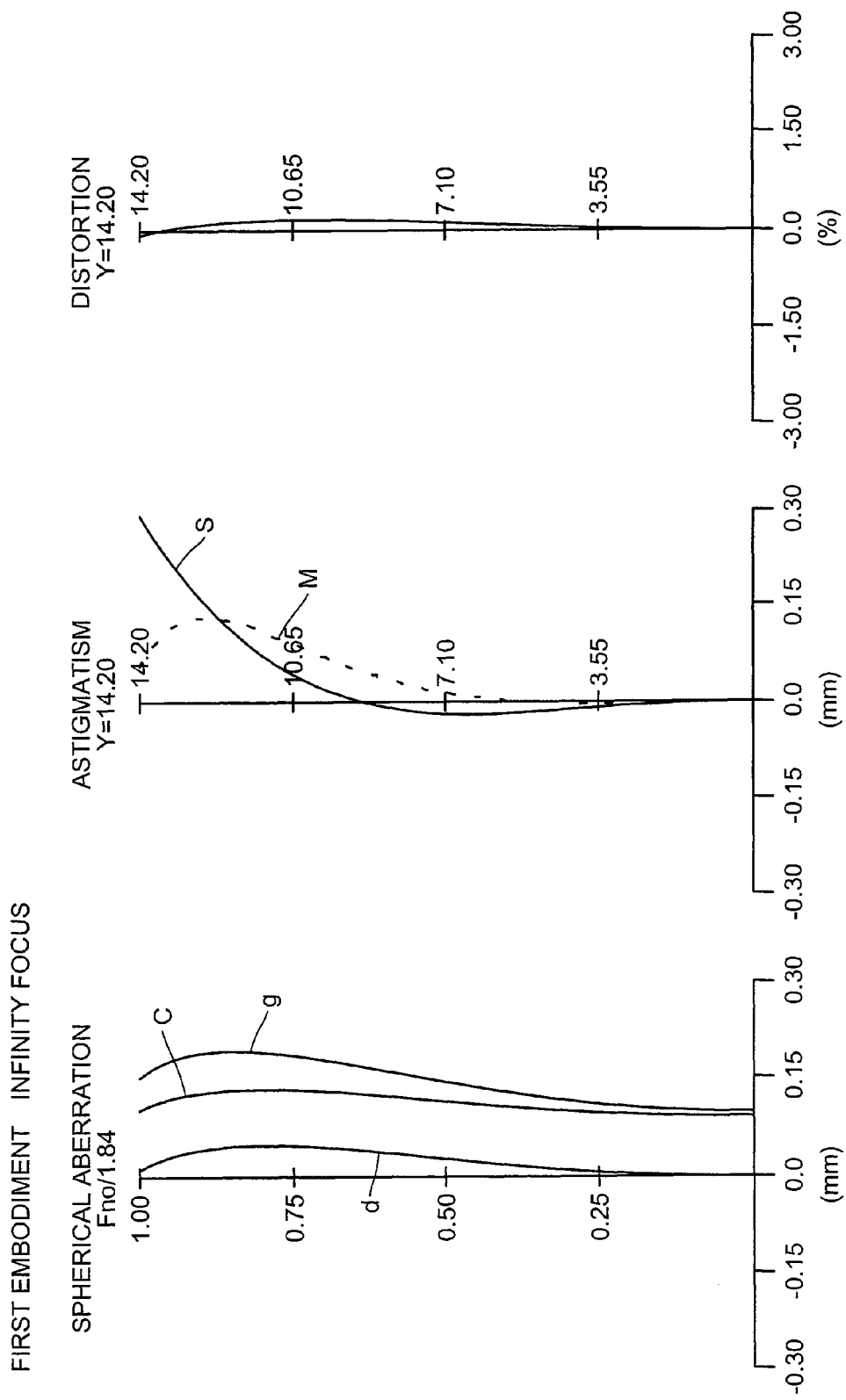
FIG. 2 is a diagram of longitudinal aberration occurring at infinity focus in the internal focus lens according to the first embodiment.
Figure 3:
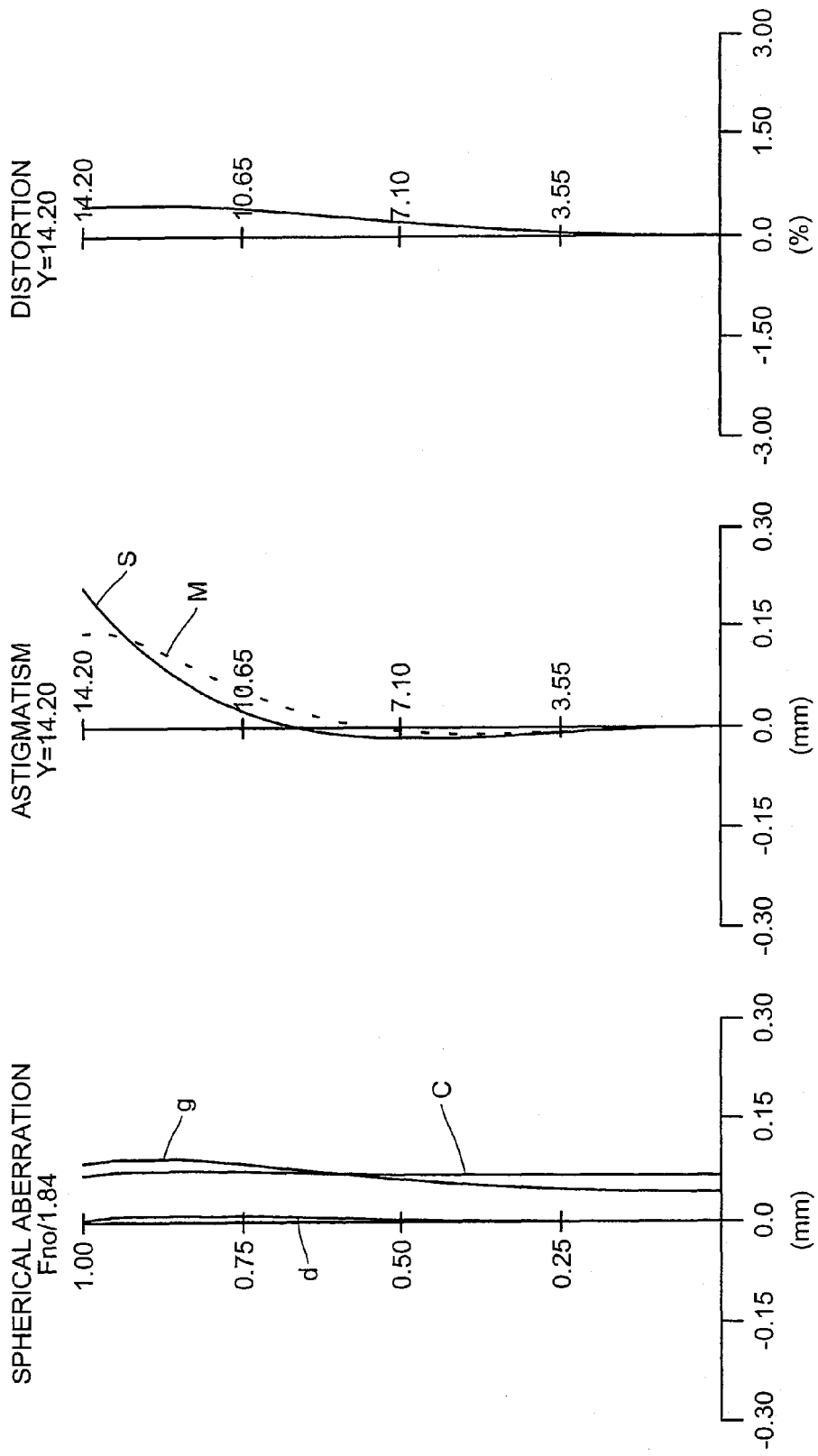
FIG. 3 is a diagram of longitudinal aberration occurring with focusing at 0.025× magnification in the internal focus lens according to the first embodiment.
Figure 4:
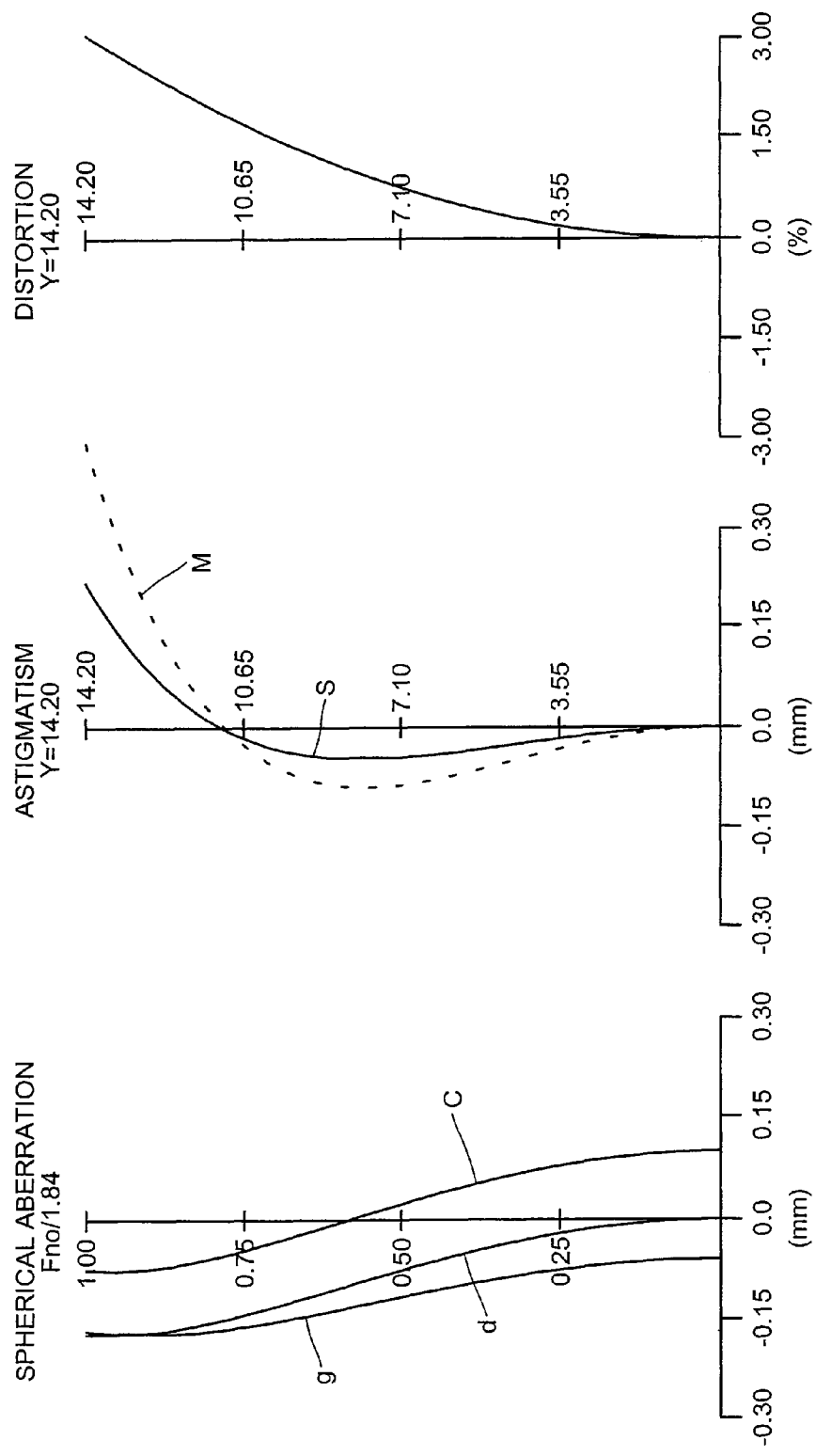
FIG. 4 is a diagram of longitudinal aberration occurring with focusing at the minimum object distance in the internal focus lens according to the first embodiment.

FIG. 2 is a diagram of longitudinal aberration occurring at infinity focus in the internal focus lens according to the first embodiment. FIG. 3 is a diagram of longitudinal aberration occurring with focusing at 0.025x magnification in the internal focus lens according to the first embodiment. FIG. 4 is a diagram of longitudinal aberration occurring with focusing at the minimum object distance in the internal focus lens according to the first embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 5:
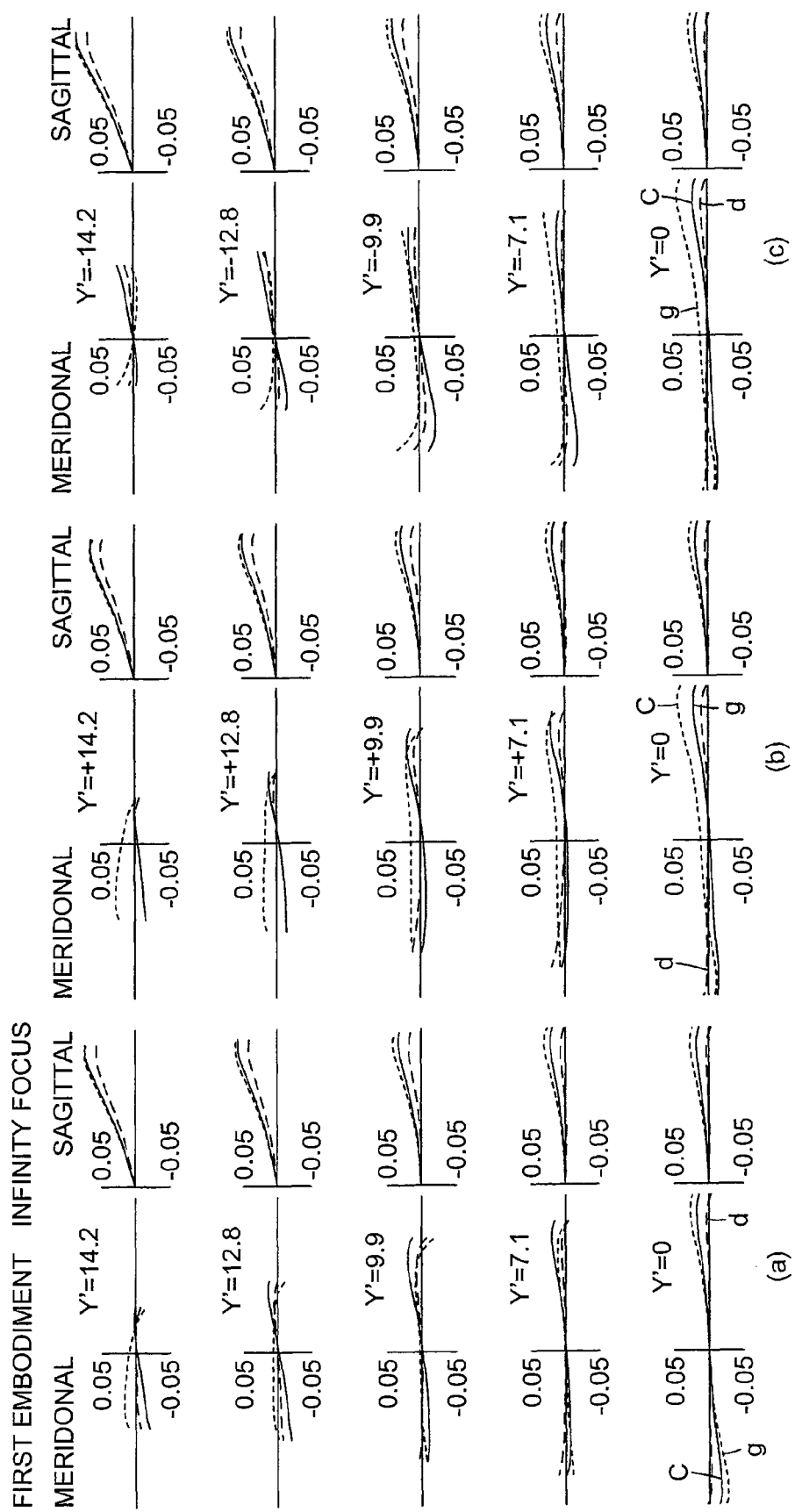
FIG. 5 is a diagram of lateral aberration occurring at infinity focus in the internal focus lens according to the first embodiment.
Figure 6:
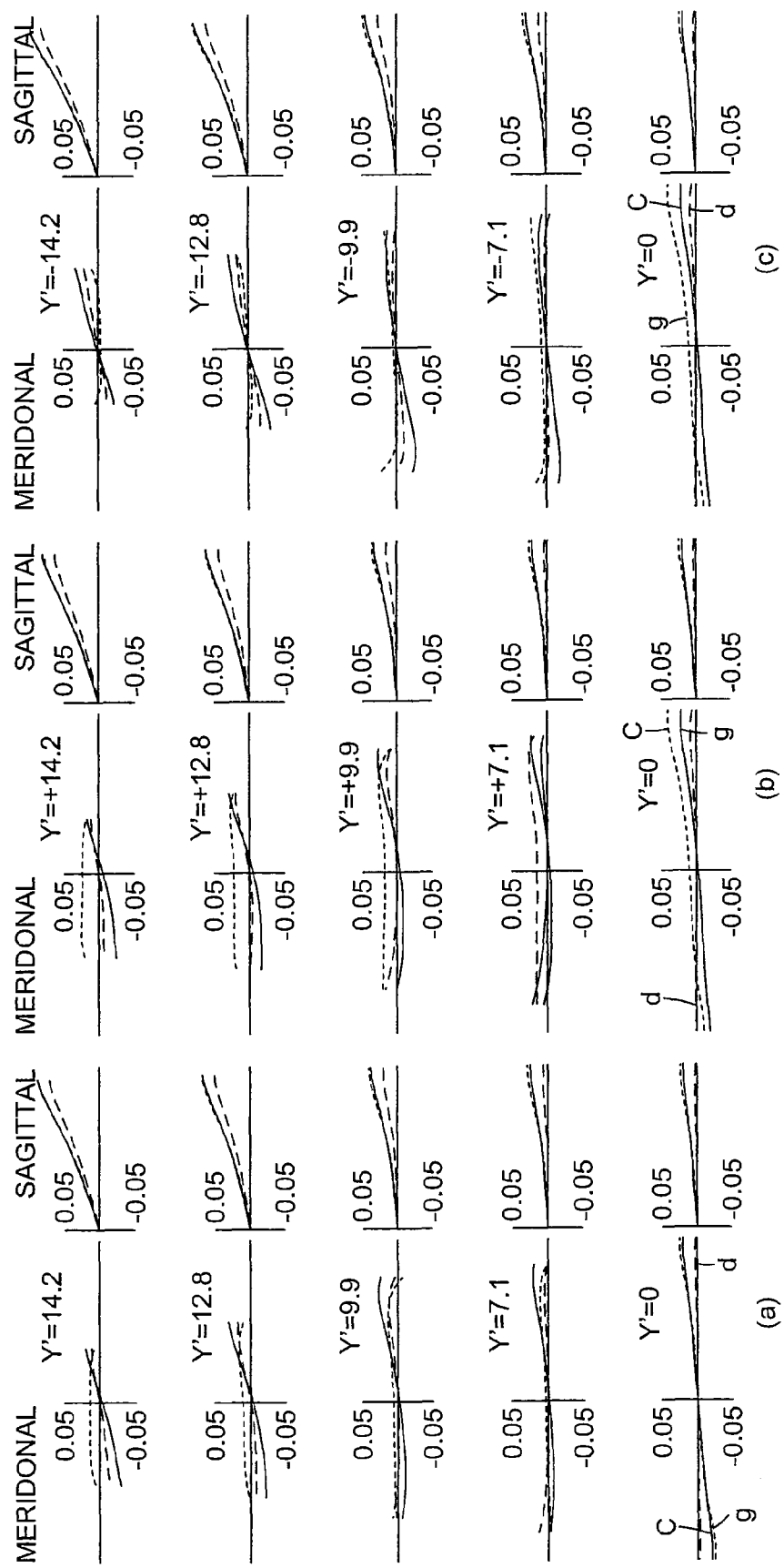
FIG. 6 is a diagram of lateral aberration occurring with focusing at 0.025× magnification in the internal focus lens according to the first embodiment.
Figure 7:
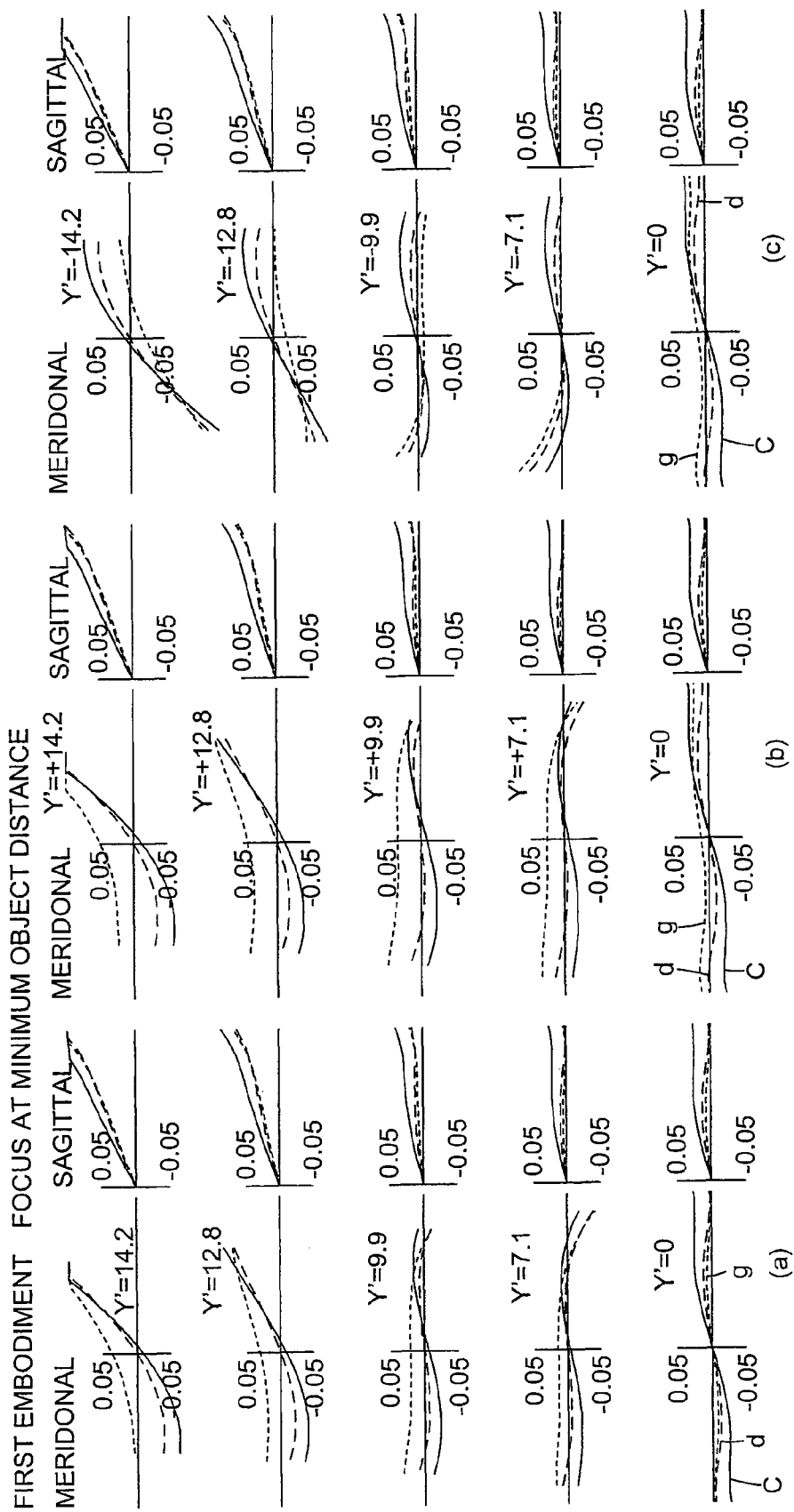
FIG. 7 is a diagram of lateral aberration occurring with focusing at the minimum object distance in the internal focus lens according to the first embodiment.

FIG. 5 is a diagram of lateral aberration occurring at infinity focus in the internal focus lens according to the first embodiment. FIG. 6 is a diagram of lateral aberration occurring with focusing at 0.025x magnification in the internal focus lens according to the first embodiment. FIG. 7 is a diagram of lateral aberration occurring with focusing at the minimum object distance in the internal focus lens according to the first embodiment. In the diagrams, (a) depicts lateral aberration curves at actual image heights (Y') of 0.0 mm to 14.2 mm when anti-vibration correction is not performed, (b) depicts lateral aberration curves at actual image heights (Y') of 0.0 mm to 14.2 mm when during anti-vibration correction, the negative lens L114 (anti-vibration lens) is moved 0.50 mm in an upward direction orthogonal to the optical axis, and the image position is moved corresponding to an angle of view of 0.3 degrees, (c) depicts lateral aberration curves at actual image heights (Y') of 0.0 mm to −14.2 mm when during anti-vibration correction, the negative lens L114 (anti-vibration lens) is moved −0.50 mm in a downward direction orthogonal to the optical axis, and the image position is moved corresponding to an angle of view of −0.3 degrees. In the diagrams, g, d, and C represent wavelength aberration at g-line (λ=435.83 nm), at d-line (λ=587.56 nm), and at C-line (λ=656.28 nm), respectively.

Figure 8:
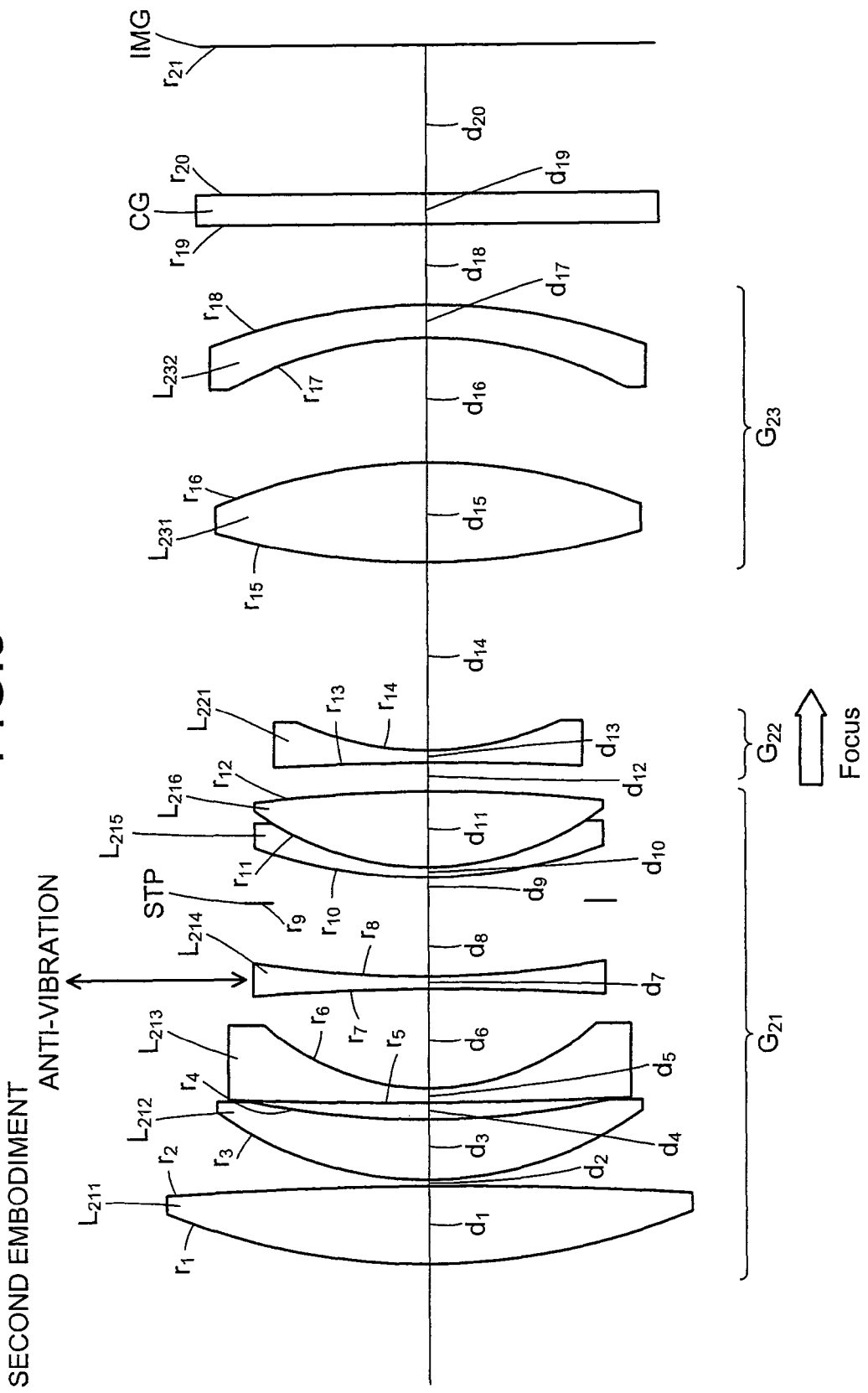
FIG. 8 is a cross sectional view (along an optical axis) of the internal focus lens according to a second embodiment.

FIG. 8 is a cross sectional view (along an optical axis) of the internal focus lens according to a second embodiment. The internal focus lens includes sequentially from the object side, a first lens group $G_{21}$ having a positive refractive power, a second lens group $G_{22}$ having a negative refractive power, and a third lens group $G_{23}$ having a positive refractive power. Between the third lens group $G_{23}$ and the imaging plane IMG, the cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{21}$ includes sequentially from the object side, a positive lens $L_{211}$, a positive lens $L_{212}$, a negative lens $L_{213}$, a negative lens $L_{214}$, the aperture stop STP prescribing a given aperture, a negative lens $L_{215}$, and a positive lens $L_{216}$. The negative lens $L_{215}$ and the positive lens $L_{216}$ are cemented. The negative lens $L_{214}$ has a function as the anti-vibration lens. In other words, the negative lens $L_{214}$ is moved in a direction orthogonal to the optical axis (deviating from center) whereby image blur caused by optical system vibration consequent to, for example, hand-shake is corrected. In particular, by reducing the refractive power of the negative lens $L_{214}$, the curvature is also reduced, thereby enabling the negative lens $L_{214}$ to be thinner and lighter in weight. Disposal of the aperture stop STP farther on the imaging plane IMG side than the negative lens $L_{214}$, which is the anti-vibration lens, enables the diameter of subsequent lenses to be reduced. The lens configuration of the first lens group $G_{21}$ is maintained substantially symmetrically about the aperture stop STP.

The second lens group $G_{22}$ is configured by a negative lens $L_{221}$. The second lens group $G_{22}$ is moved along the optical axis, from the object side toward the imaging plane IMG, whereby focusing from infinity focus to focus at the minimum object distance is performed.

The third lens group $G_{23}$ includes sequentially from the object side, a positive lens $L_{231}$ and a negative lens $L_{232}$.

Here, various values related to the internal focus lens according to the second embodiment are given.

(Lens Data)

| | | |
|---|---|---|
| $r_1 = 44.8799$ | | |
| $d_1 = 4.8446$ | $nd_1 = 1.83481$ | $vd_1 = 42.72$ |
| $r_2 = -275.016$ | | |
| $d_2 = 0.4$ | | |
| $r_3 = 23.3824$ | | |
| $d_3 = 3.6557$ | $nd_2 = 1.91082$ | $vd_2 = 35.25$ |
| $r_4 = 55.6626$ | | |
| $d_4 = 1.0221$ | | |
| $r_5 = 263.1267$ | | |
| $d_5 = 0.9$ | $nd_3 = 1.72825$ | $vd_3 = 28.32$ |
| $r_6 = 15.5392$ | | |
| $d_6 = 6.1331$ | | |
| $r_7 = -140.202$ | | |
| $d_7 = 0.8$ | $nd_4 = 1.8061$ | $vd_4 = 33.27$ |
| $r_8 = 67.9694$ | | |
| $d_8 = 4.575$ | | |
| $r_9 = \infty$ (aperture stop) | | |
| $d_9 = 1.5$ | | |
| $r_{10} = 30.4655$ | | |
| $d_{10} = 0.7$ | $nd_5 = 1.84666$ | $vd_5 = 23.78$ |
| $r_{11} = 18.0217$ | | |
| $d_{11} = 4.7707$ | $nd_6 = 1.83481$ | $vd_6 = 42.72$ |
| $r_{12} = -80.3201$ | | |
| $d_{12} = D(12)$ (variable) | | |
| $r_{13} = -142.554$ | | |
| $d_{13} = 0.7$ | $nd_7 = 1.62041$ | $vd_7 = 60.34$ |
| $r_{14} = 20.3958$ | | |
| $d_{14} = D(14)$ (variable) | | |
| $r_{15} = 46.8341$ | | |
| $d_{15} = 6.215$ | $nd_8 = 1.72916$ | $vd_8 = 54.67$ |
| $r_{16} = -33.8583$ | | |
| $d_{16} = 7.8104$ | | |
| $r_{17} = -25.3869$ | | |
| $d_{17} = 2$ | $nd_9 = 1.80518$ | $vd_9 = 25.46$ |
| $r_{18} = -38.0301$ | | |
| $d_{18} = 5$ | | |
| $r_{19} = \infty$ | | |
| $d_{19} = 2$ | $nd_{10} = 1.5168$ | $vd_{10} = 64.2$ |
| $r_{20} = \infty$ | | |

-continued $d_{20} = 9.15$
$r_{21} = \infty$ (imaging plane)

(Values for focusing states)

|  | Infinity | 0.025x | Min. Object Dist. (0.142x) |
|---|---|---|---|
| D(12) | 1.796 | 2.630 | 6.599 |
| D(14) | 11.829 | 10.994 | 7.027 |
| image height(Y) | 14.20 | 14.20 | 14.20 | f (focal length of entire optical system) = 51.30
Fno = 1.85
ω(half-angle) = 15.43
βvr (magnification of negative lens L214 (anti-vibration lens)) = −10.46
βr (collective magnification of second lens group $G_{22}$ and third lens group $G_{23}$) = −0.05
fvr (focal length of negative lens $L_{214}$ (anti-vibration lens)) = −56.69
f3(focal length of third lens group $G_{23}$) = 35.02
(Values related to conditional expression (1)) |f/((1 − βvr) × βr)| = 82.21
(Values related to conditional expression (2)) |fvr|/f = 1.11
(Values related to conditional expression (3)) |f3|/f = 0.68

Figure 9:
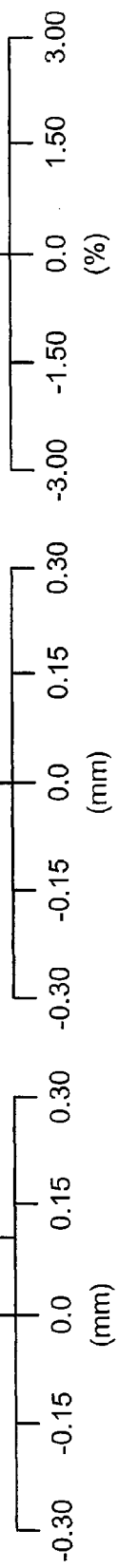
FIG. 9 is a diagram of longitudinal aberration occurring at infinity focus in the internal focus lens according to the second embodiment.
Figure 10:
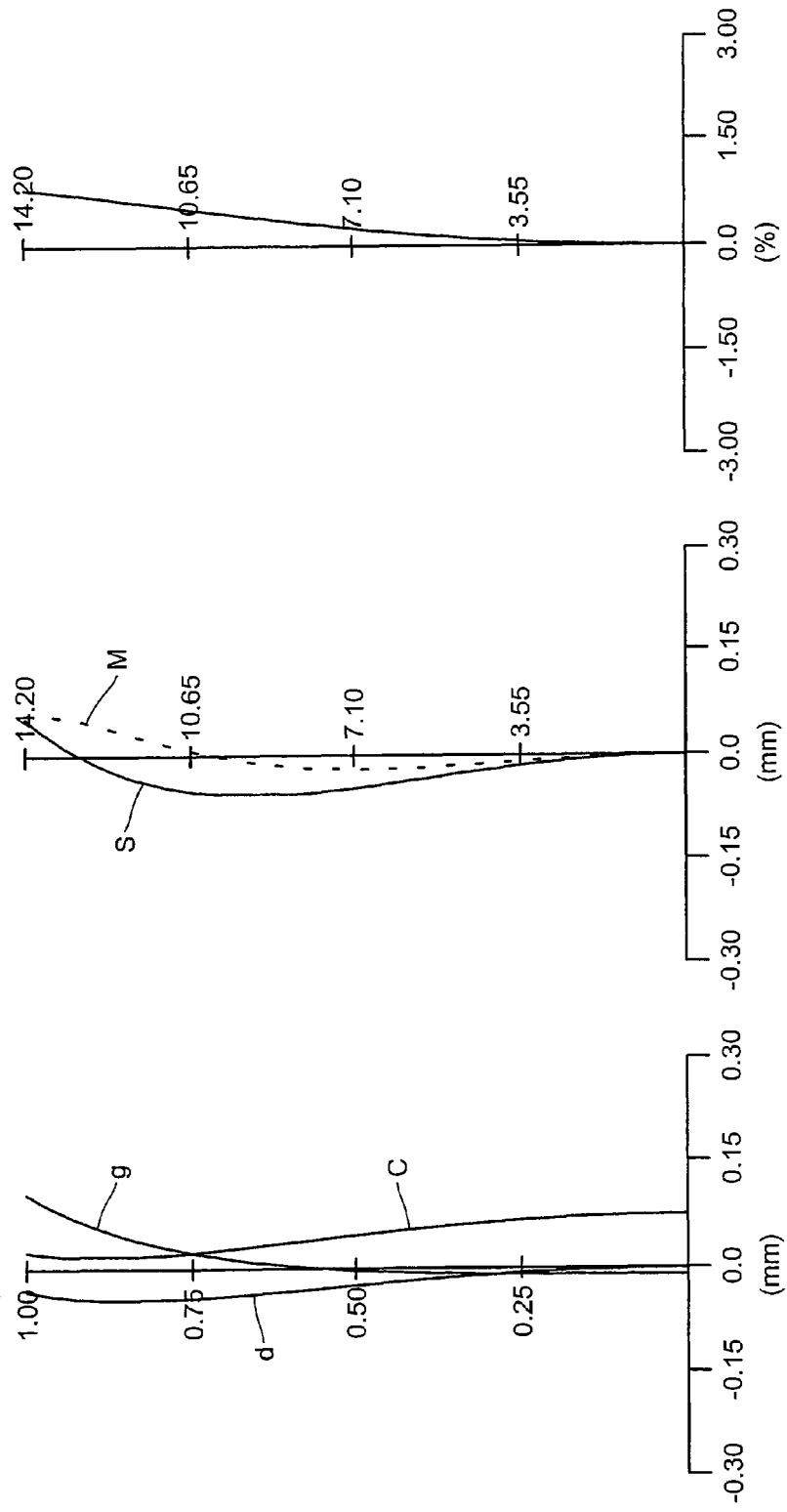
FIG. 10 is a diagram of longitudinal aberration occurring with focusing at 0.025× magnification in the internal focus lens according to the second embodiment.
Figure 11:
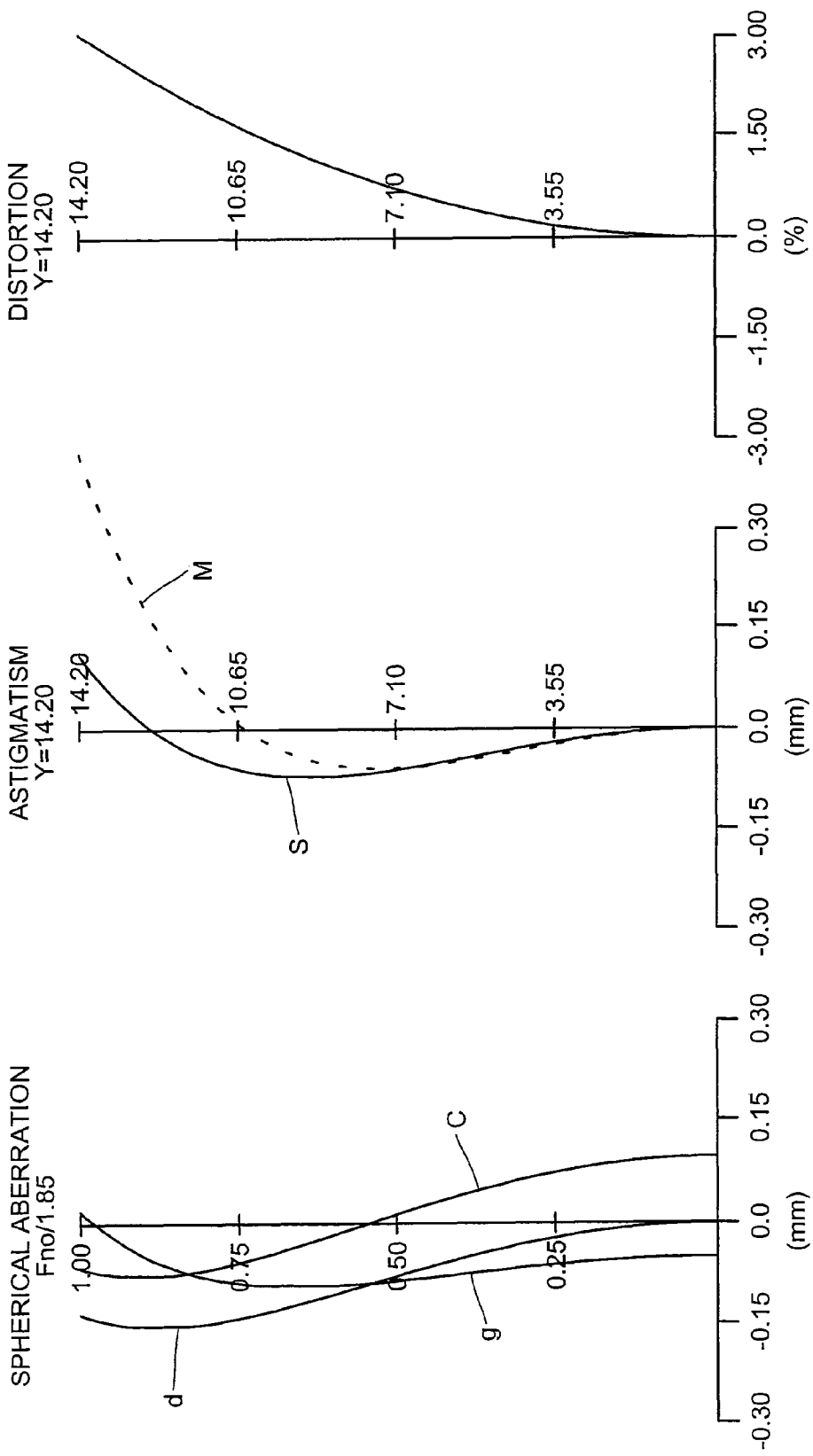
FIG. 11 is a diagram of longitudinal aberration occurring with focusing at the minimum object distance in the internal focus lens according to the second embodiment.

FIG. 9 is a diagram of longitudinal aberration occurring at infinity focus in the internal focus lens according to the second embodiment. FIG. 10 is a diagram of longitudinal aberration occurring with focusing at 0.025× magnification in the internal focus lens according to the second embodiment. FIG. 11 is a diagram of longitudinal aberration occurring with focusing at the minimum object distance in the internal focus lens according to the second embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 12:
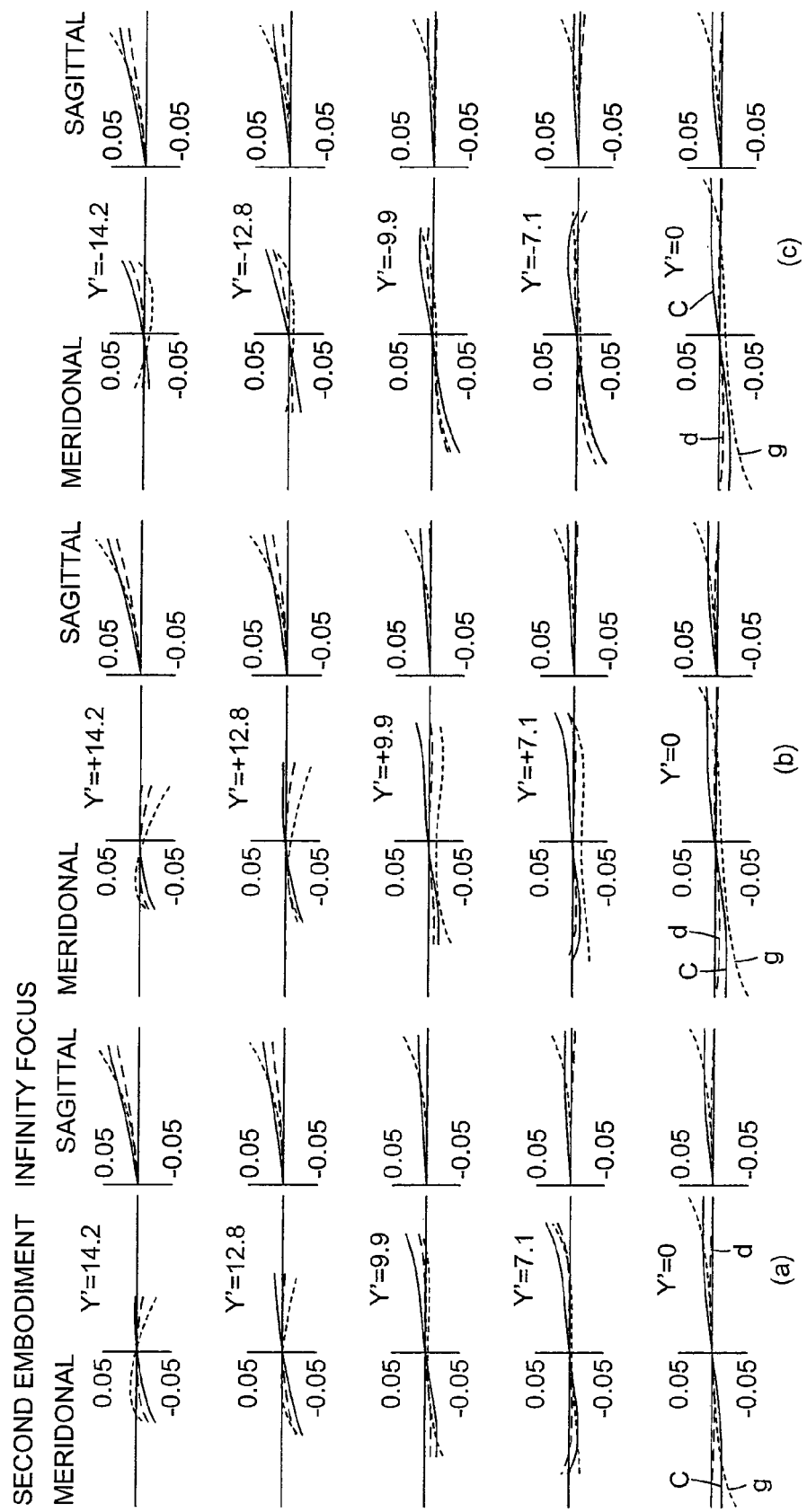
FIG. 12 is a diagram of lateral aberration occurring at infinity focus in the internal focus lens according to the second embodiment.
Figure 13:
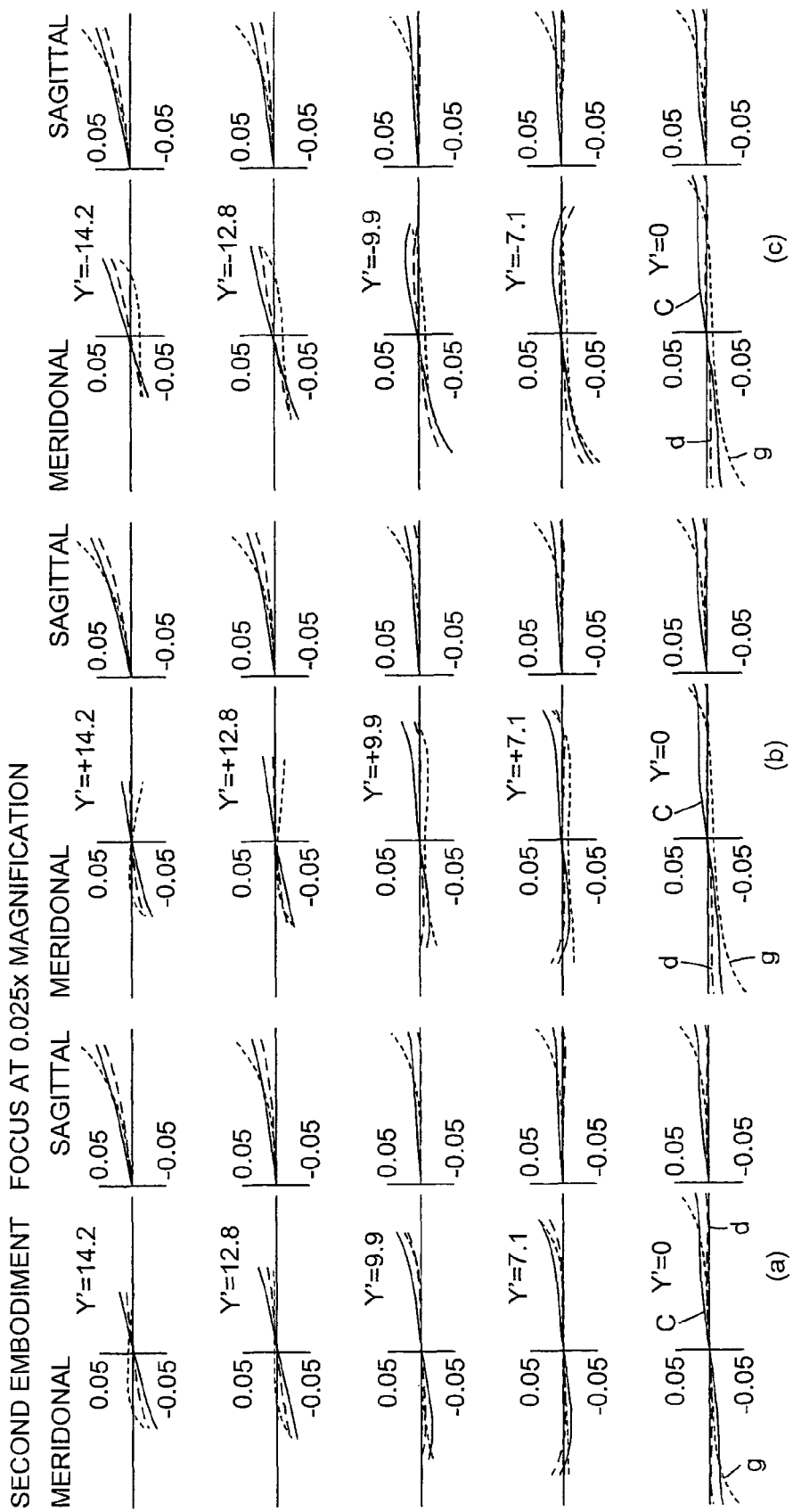
FIG. 13 is a diagram of lateral aberration occurring with focusing at 0.025× magnification in the internal focus lens according to the second embodiment.
Figure 14:
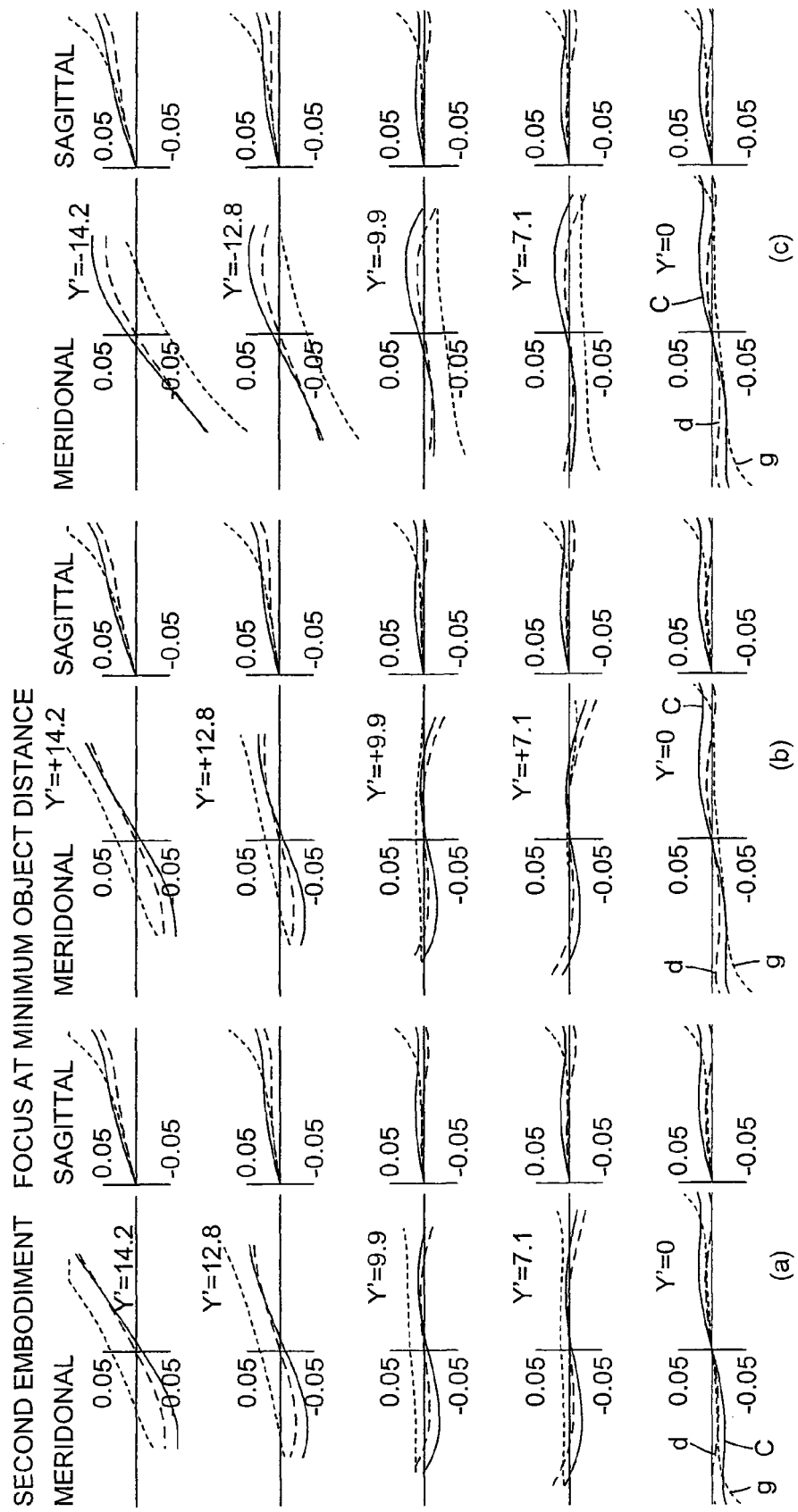
FIG. 14 is a diagram of lateral aberration occurring with focusing at the minimum object distance in the internal focus lens according to the second embodiment.

FIG. 12 is a diagram of lateral aberration occurring at infinity focus in the internal focus lens according to the second embodiment. FIG. 13 is a diagram of lateral aberration occurring with focusing at 0.025× magnification in the internal focus lens according to the second embodiment. FIG. 14 is a diagram of lateral aberration occurring with focusing at the minimum object distance in the internal focus lens according to the second embodiment. In the diagrams, (a) depicts lateral aberration curves at actual image heights (Y') of 0.0 mm to 14.2 mm when anti-vibration correction is not performed, (b) depicts lateral aberration curves at actual image heights (Y') of 0.0 mm to 14.2 mm when during anti-vibration correction, the negative lens $L_{214}$ (anti-vibration lens) is moved 0.43 mm in an upward direction orthogonal to the optical axis, and the image position is moved corresponding to an angle of view of 0.3 degrees, (c) depicts lateral aberration curves at actual image heights (Y') of 0.0 mm to −14.2 mm when during anti-vibration correction, the negative lens $L_{214}$ (anti-vibration lens) is moved −0.43 mm in a downward direction orthogonal to the optical axis, and the image position is moved corresponding to an angle of view of −0.3 degrees. In the diagrams, g, d, and C represent wavelength aberration at g-line (λ=435.83 nm), at d-line (λ=587.56 nm), and at C-line (λ=656.28 nm), respectively.

Figure 15:
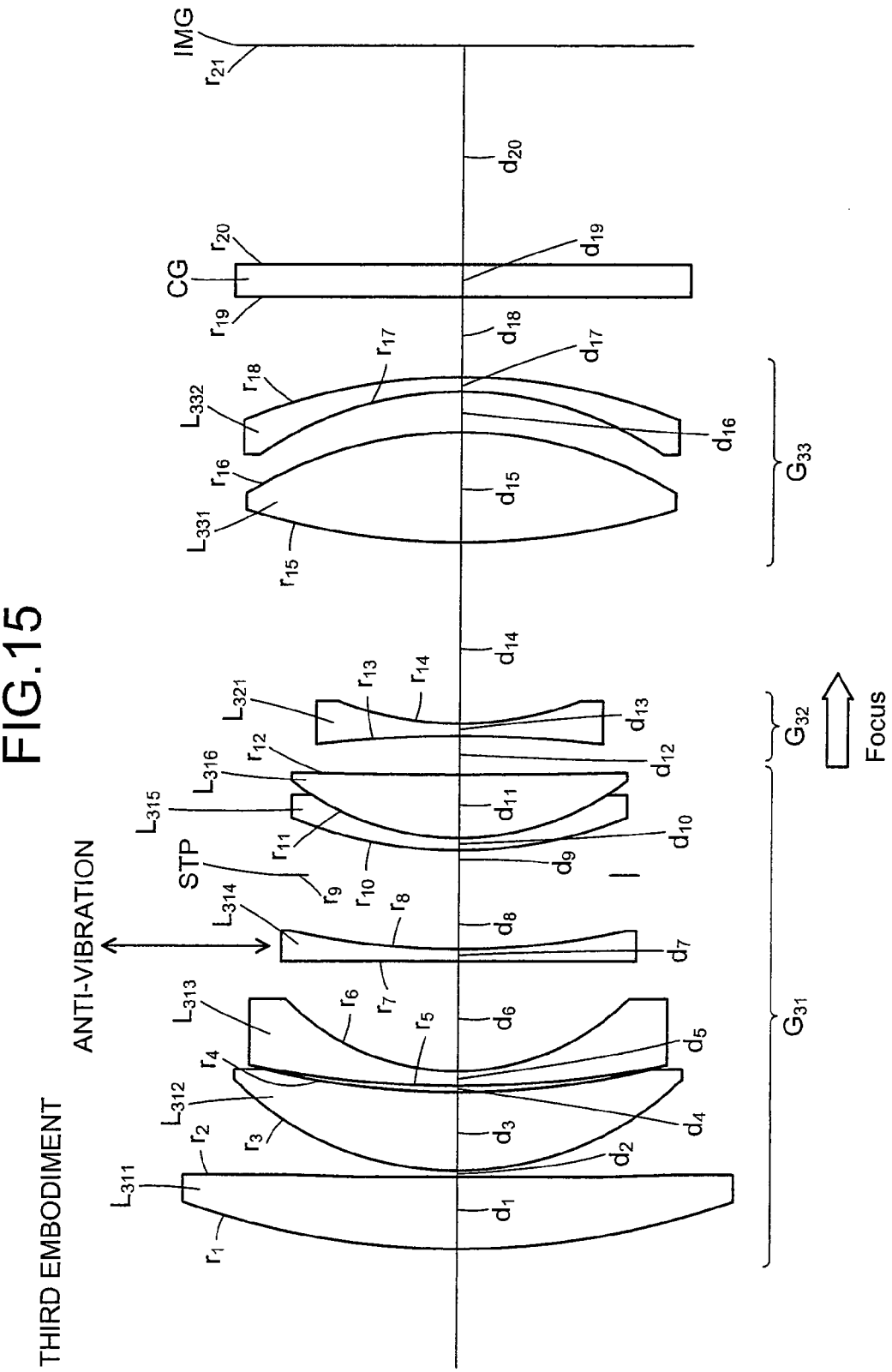
FIG. 15 is a cross sectional view (along an optical axis) of the internal focus lens according to a third embodiment.

FIG. 15 is a cross sectional view (along an optical axis) of the internal focus lens according to a third embodiment. The internal focus lens includes sequentially from the object side, a first lens group $G_{31}$ having a positive refractive power, a second lens group $G_{32}$ having a negative refractive power, and a third lens group $G_{33}$ having a positive refractive power. Between the third lens group $G_{33}$ and the imaging plane IMG, the cover glass CG is disposed. The cover glass CG is disposed as necessary and may be omitted when not necessary.

At the imaging plane IMG, the light receiving surface of an imaging sensor such as a CCD, CMOS, etc. is disposed.

The first lens group $G_{31}$ includes sequentially from the object side, a positive lens $L_{311}$, a positive lens $L_{312}$, a negative lens $L_{313}$, a negative lens $L_{314}$, the aperture stop STP prescribing a given aperture, a negative lens $L_{315}$, and a positive lens $L_{316}$. The negative lens $L_{315}$ and the positive lens $L_{316}$ are cemented. The negative lens $L_{314}$ has a function as the anti-vibration lens. In other words, the negative lens $L_{314}$ is moved in a direction orthogonal to the optical axis (deviating from center) whereby image blur caused by optical system vibration consequent to, for example, hand-shake is corrected. In particular, by reducing the refractive power of the negative lens $L_{314}$, the curvature is also reduced, thereby enabling the negative lens $L_{314}$ to be thinner and lighter in weight. Disposal of the aperture stop STP farther on the imaging plane IMG side than the negative lens $L_{314}$, which is the anti-vibration lens, enables the diameter of subsequent lenses to be reduced. The lens configuration of the first lens group $G_{31}$ is maintained substantially symmetrically about the aperture stop STP.

The second lens group $G_{32}$ is configured by a negative lens $L_{321}$. The second lens group $G_{32}$ is moved along the optical axis, from the object side toward the imaging plane IMG, whereby focusing from infinity focus to focus at the minimum object distance is performed.

The third lens group $G_{33}$ includes sequentially from the object side, a positive lens $L_{331}$ and a negative lens $L_{332}$.

Here, various values related to the internal focus lens according to the third embodiment are given.

(Lens Data)

| | | |
|---|---|---|
| $r_1 = 51.1089$ | | |
| $d_1 = 4.4589$ | $nd_1 = 1.83481$ | $vd_1 = 42.72$ |
| $r_2 = 860.7509$ | | |
| $d_2 = 0.4$ | | |
| $r_3 = 20.422$ | | |
| $d_3 = 4.864$ | $nd_2 = 1.83481$ | $vd_2 = 42.72$ |
| $r_4 = 55.2644$ | | |
| $d_4 = 0.3361$ | | |
| $r_5 = 66.8698$ | | |
| $d_5 = 0.9$ | $nd_3 = 1.72825$ | $vd_3 = 28.32$ |
| $r_6 = 14.8274$ | | |
| $d_6 = 6.8027$ | | |
| $r_7 = -970.474$ | | |
| $d_7 = 0.8$ | $nd_4 = 1.72825$ | $vd_4 = 28.32$ |
| $r_8 = 49.3221$ | | |
| $d_8 = 4.5853$ | | |
| $r_9 = \infty$ (aperture stop) | | |
| $d_9 = 1.5$ | | |
| $r_{10} = 28.105$ | | |
| $d_{10} = 0.8$ | $nd_5 = 1.84666$ | $vd_5 = 23.78$ |
| $r_{11} = 17.0221$ | | |
| $d_{11} = 3.9726$ | $nd_6 = 1.91082$ | $vd_6 = 35.25$ |
| $r_{12} = 454.2894$ | | |
| $d_{12} = D(12)$ (variable) | | |
| $r_{13} = -79.8991$ | | |
| $d_{13} = 0.7$ | $nd_7 = 1.603$ | $vd_7 = 65.44$ |
| $r_{14} = 19.9883$ | | |
| $d_{14} = D(14)$ (variable) | | |
| $r_{15} = 43.4828$ | | |
| $d_{15} = 7$ | $nd_8 = 1.72916$ | $vd_8 = 54.67$ |
| $r_{16} = -25.6466$ | | |
| $d_{16} = 2.5$ | | |
| $r_{17} = -21.9075$ | | |
| $d_{17} = 0.958$ | $nd_9 = 1.80809$ | $vd_9 = 22.76$ |
| $r_{18} = -35.5597$ | | |
| $d_{18} = 5$ | | |
| $r_{19} = \infty$ | | |
| $d_{19} = 2$ | $nd_{10} = 1.5168$ | $vd_{10} = 64.2$ |
| $r_{20} = \infty$ | | |
| $d_{20} = 13.6221$ | | |
| $r_{21} = \infty$ (imaging plane) | | |

-continued

(Values for focusing states)

|  | Infinity | 0.025x | Min. Object Dist. (0.142x) |
|---|---|---|---|
| D(12) | 2.418 | 3.258 | 7.488 |
| D(14) | 11.384 | 10.545 | 6.315 |
| image height(Y) | 14.20 | 14.20 | 14.20 | f (focal length of entire optical system) = 53.00
Fno = 1.87
ω(half-angle) = 15.12
βvr (magnification of negative lens L314 (anti-vibration lens)) = 5.05
βr (collective magnification of second lens group $G_{32}$ and third lens group $G_{33}$) = 0.14
fvr (focal length of negative lens $L_{314}$ (anti-vibration lens)) = −64.43
f3 (focal length of third lens group $G_{33}$) = 31.80
(Values related to conditional expression (1)) |f/((1 − βvr) × βr)| = 95.49
(Values related to conditional expression (2)) |fvr|/f = 1.22
(Values related to conditional expression (3)) |f3|/f = 0.60

Figure 16:
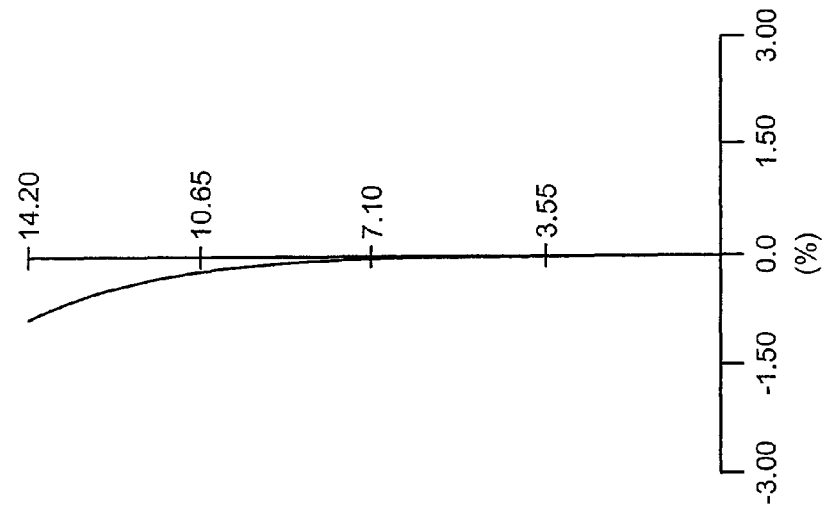
FIG. 16 is a diagram of longitudinal aberration occurring at infinity focus in the internal focus lens according to the third embodiment.
Figure 17:
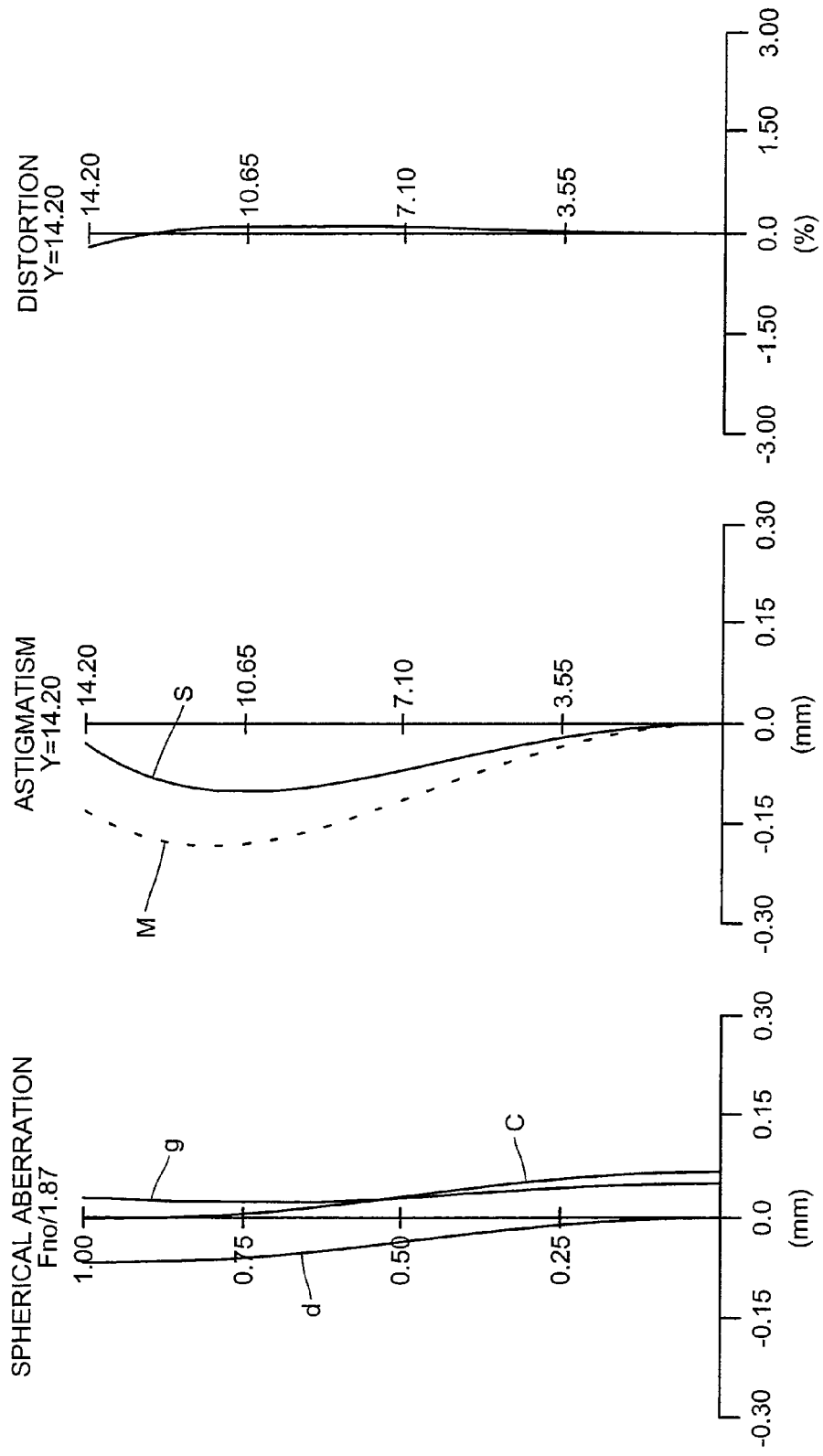
FIG. 17 is a diagram of longitudinal aberration occurring with focusing at 0.025× magnification in the internal focus lens according to the third embodiment.
Figure 18:
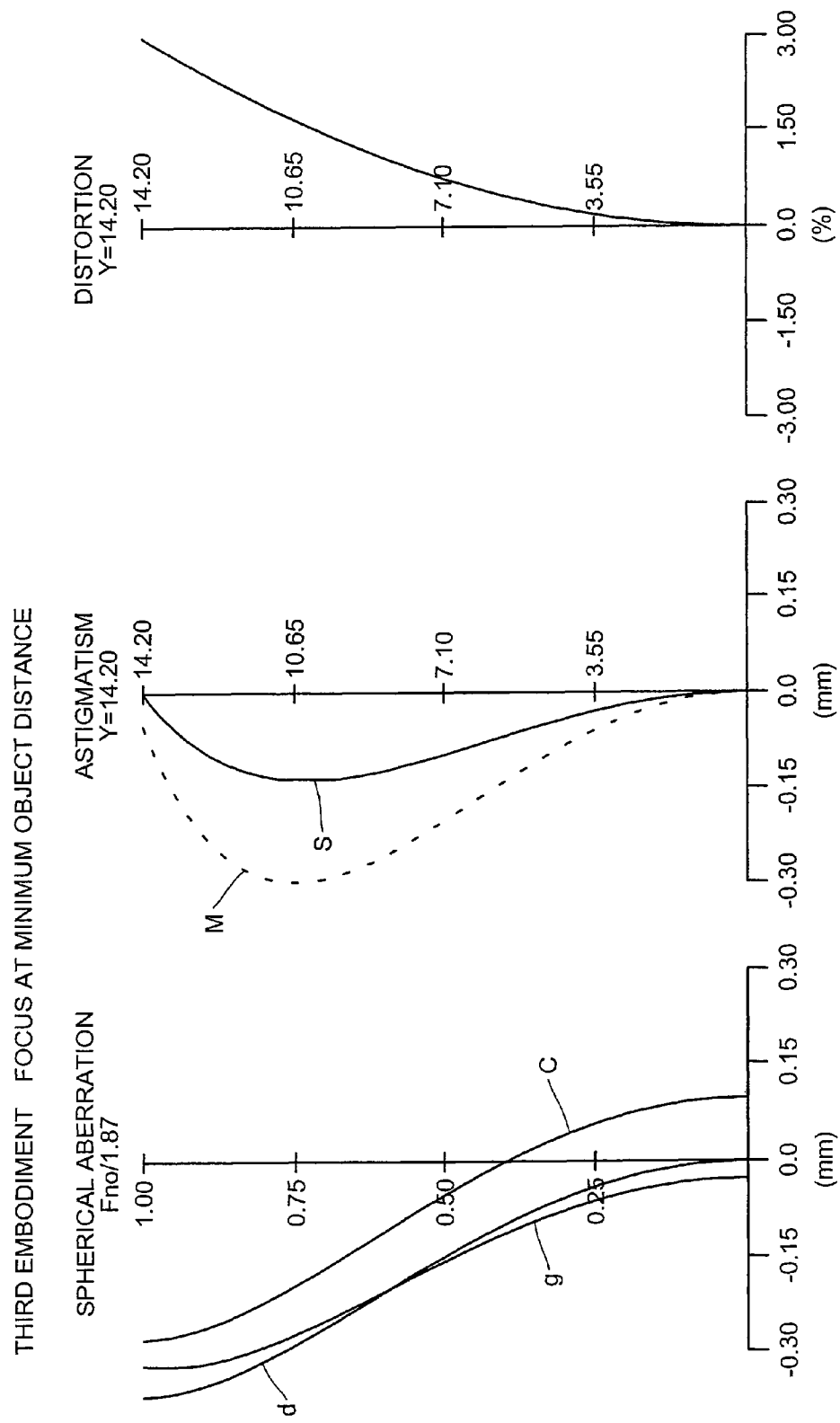
FIG. 18 is a diagram of longitudinal aberration occurring with focusing at the minimum object distance in the internal focus lens according to the third embodiment.

FIG. 16 is a diagram of longitudinal aberration occurring at infinity focus in the internal focus lens according to the third embodiment. FIG. 17 is a diagram of longitudinal aberration occurring with focusing at 0.025× magnification in the internal focus lens according to the third embodiment. FIG. 18 is a diagram of longitudinal aberration occurring with focusing at the minimum object distance in the internal focus lens according to the third embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 19:
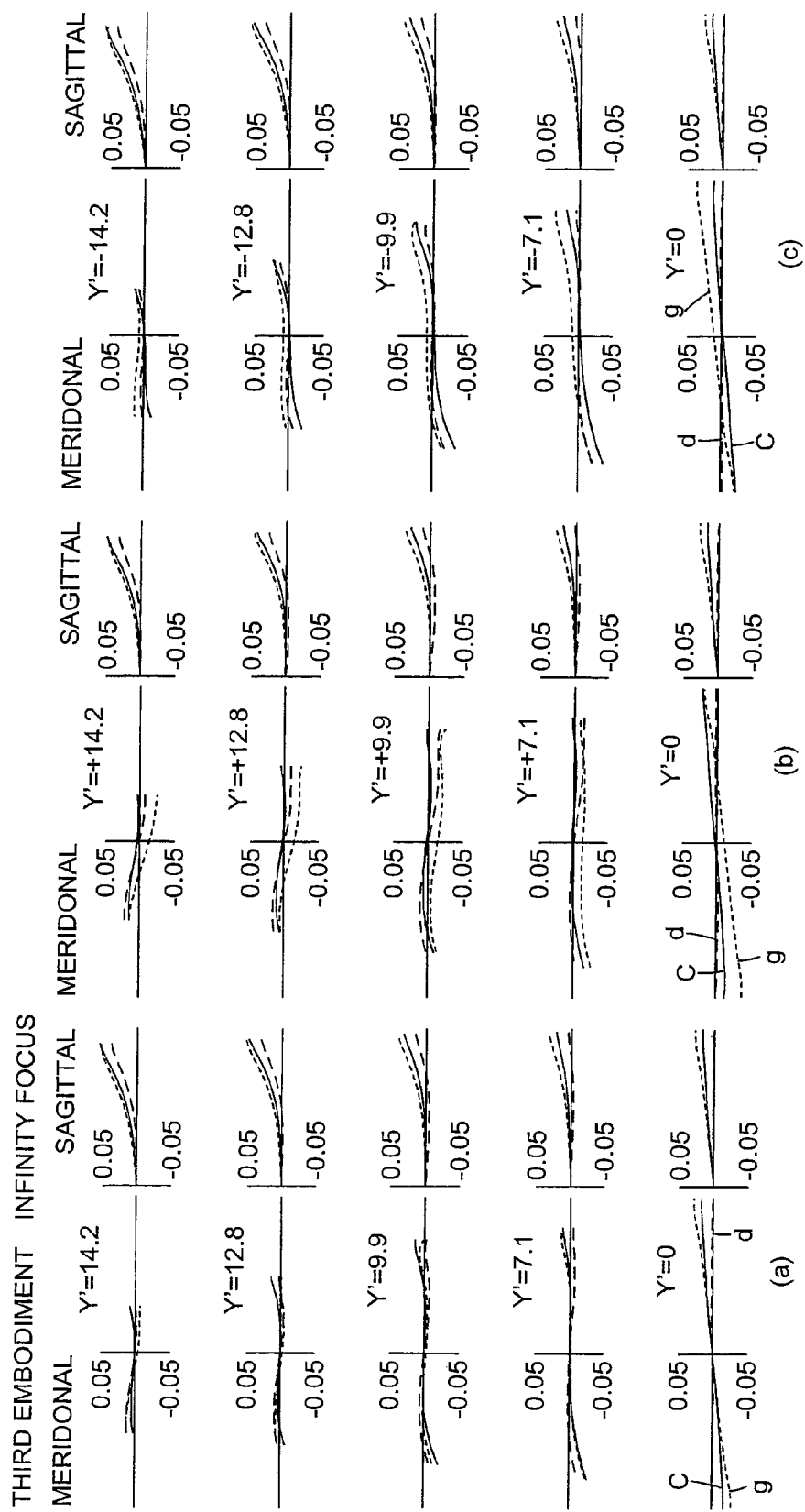
FIG. 19 is a diagram of lateral aberration occurring at infinity focus in the internal focus lens according to the third embodiment.
Figure 20:
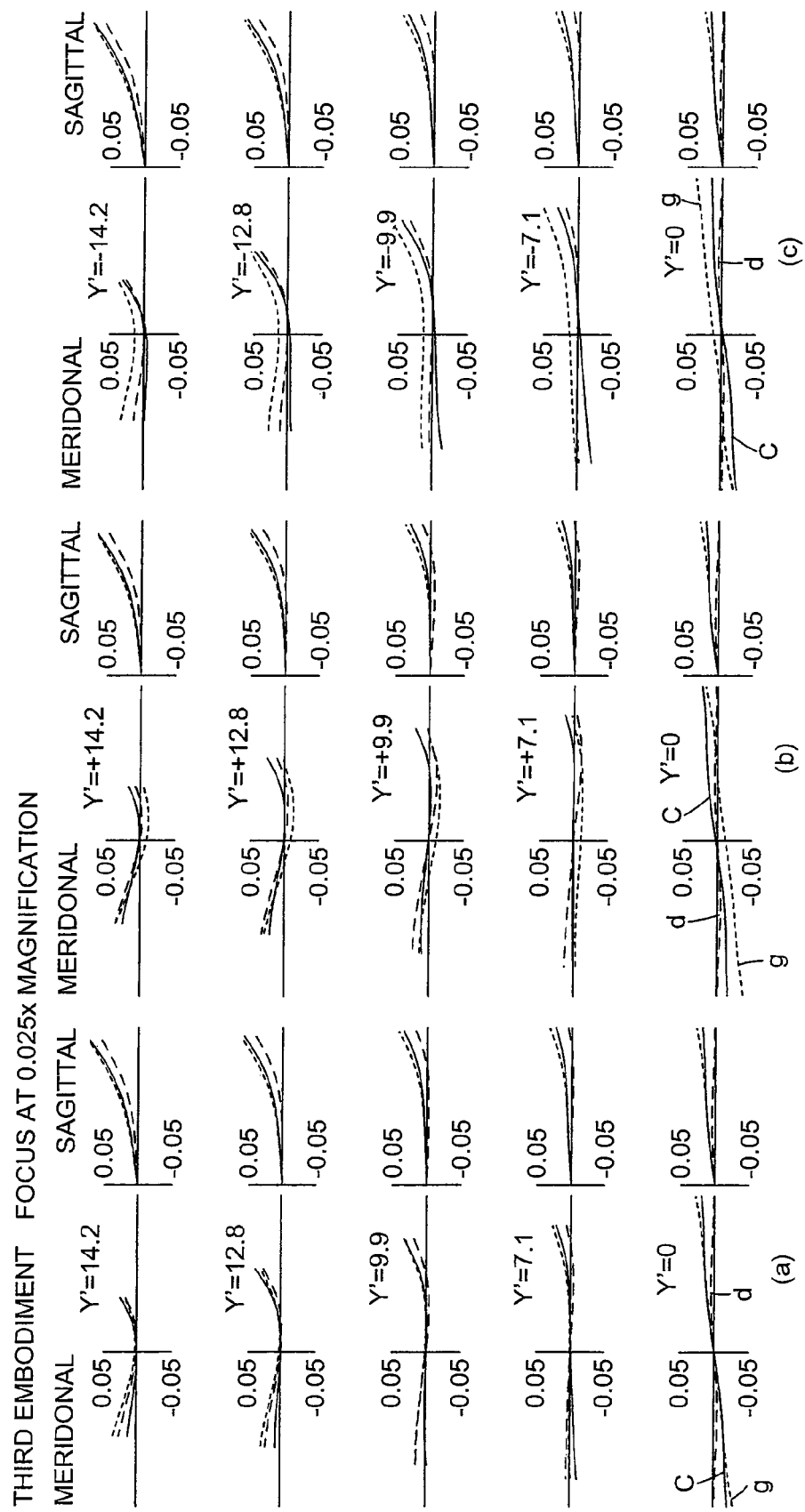
FIG. 20 is a diagram of lateral aberration occurring with focusing at 0.025× magnification in the internal focus lens according to the third embodiment.
Figure 21:
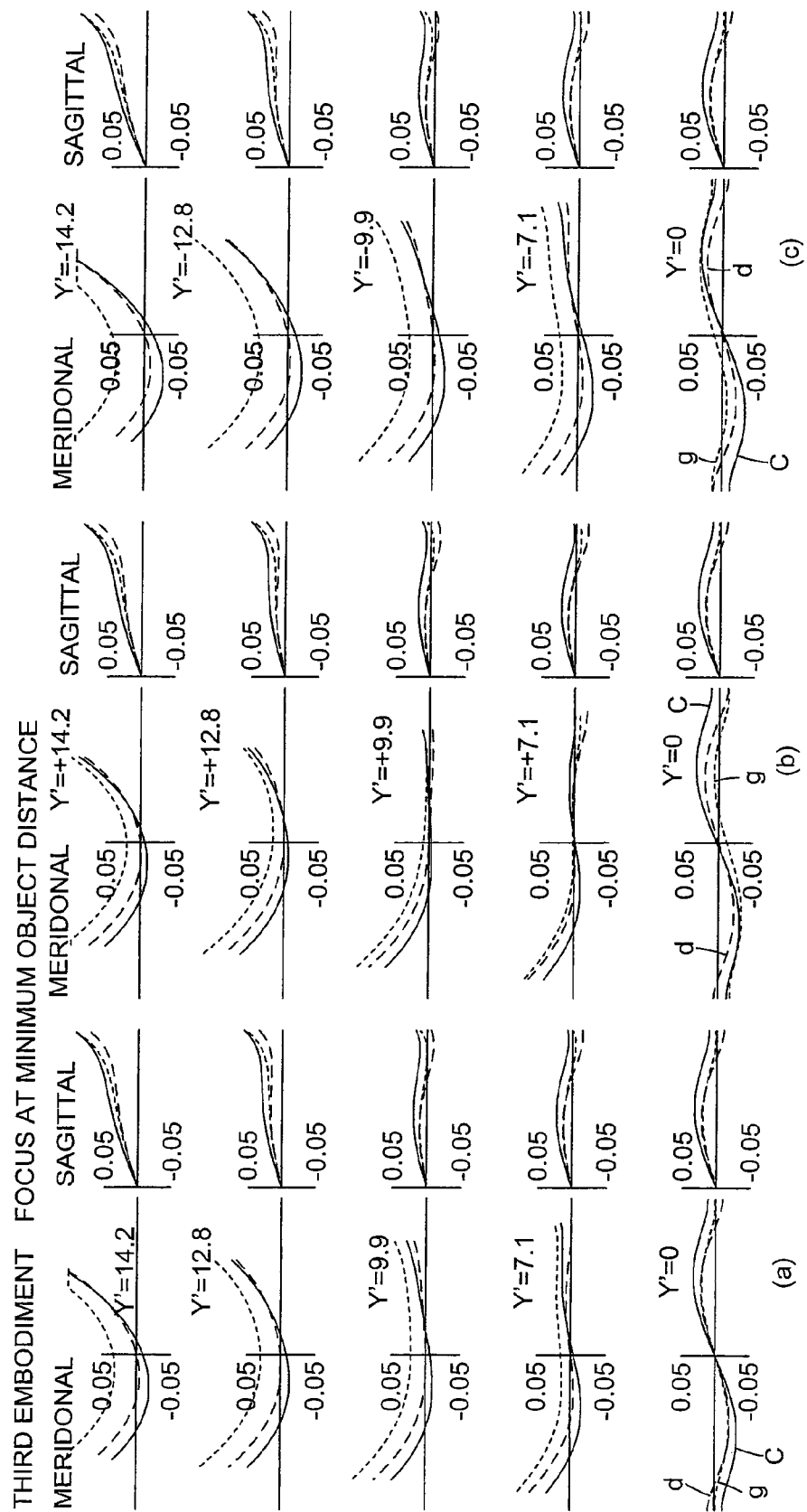
FIG. 21 is a diagram of lateral aberration occurring with focusing at the minimum object distance in the internal focus lens according to the third embodiment.

FIG. 19 is a diagram of lateral aberration occurring at infinity focus in the internal focus lens according to the third embodiment. FIG. 20 is a diagram of lateral aberration occurring with focusing at 0.025× magnification in the internal focus lens according to the third embodiment. FIG. 21 is a diagram of lateral aberration occurring with focusing at the minimum object distance in the internal focus lens according to the third embodiment. In the diagrams, (a) depicts lateral aberration curves at actual image heights (Y') of 0.0 mm to 14.2 mm when anti-vibration correction is not performed, (b) depicts lateral aberration curves at actual image heights (Y') of 0.0 mm to 14.2 mm when during anti-vibration correction, the negative lens $L_{314}$ (anti-vibration lens) is moved 0.50 mm in an upward direction orthogonal to the optical axis, and the image position is moved corresponding to an angle of view of 0.3 degrees, (c) depicts lateral aberration curves at actual image heights (Y') of 0.0 mm to −14.2 mm, when during anti-vibration correction, the negative lens $L_{314}$ (anti-vibration lens) is moved −0.50 mm in a downward direction orthogonal to the optical axis, and the image position is moved corresponding to an angle of view of −0.3 degrees. In the diagrams, g, d, and C represent wavelength aberration at g-line (λ=435.83 nm), at d-line (λ=587.56 nm), and at C-line (λ=656.28 nm), respectively.

Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refractive index of each lens with respect to the d-line (λ=587.56 nm), and $υd_1$, $υd_2$, . . . indicate the Abbe number with respect to the d-line (λ=587.56 nm). Lengths are indicated in units of [mm] and angles are indicated in [degrees].

As described, the internal focus lens of the embodiments reduces the weight of the anti-vibration lens that corrects image blur occurring with optical system vibration such as consequent to hand-shake and suppresses the distance that the anti-vibration lens moves during anti-vibration correction. Further, the disposal of the aperture stop at a suitable position within the first lens group enables the rear lens diameter of the optical system to be reduced. Satisfaction of the conditional expressions above enables a smaller internal focus lens having high imaging performance to be implemented.

As described, the internal focus lens according to the present invention is useful in photographic cameras, video cameras, etc. and is particularly suitable in imaging apparatuses that are used in places where the imaging apparatus is easily subjected to vibration.

The invention enables a compact internal focus lens to be provided that has an anti-vibration lens that is light weight and moves a short distance to correct image blur.

The invention enables a smaller internal focus lens having an anti-vibration function to be implemented.

The invention enables improvement of imaging performance without sacrificing reductions in the size of the optical system.

The invention achieves a shorter overall optical system length and facilitates improved imaging performance.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-114189 filed in Japan on May 20, 2011.

What is claimed is:

1. An internal focus lens comprising sequentially from an object side:
   a first lens group having a positive refractive power;
   a second lens group having a negative refractive power; and
   a third lens group having a positive refractive power,
      wherein
   the first lens group includes an anti-vibration lens consisting of only a single negative lens that is moved in an orthogonal direction with respect to an optical axis to correct image blur consequent to optical system vibration, and includes an aperture stop disposed farther on an image side of the first lens group than the anti-vibration lens, and
   the second lens group is moved along the optical axis to perform focusing.

2. The internal focus lens according to claim 1 wherein conditional expression (1) 65.76<|f/((1−βvr)×βr)|<114.59 is satisfied, where f is the focal length of the entire optical system, βvr is the magnification of the anti-vibration lens, and βr is the collective magnification of a lens group disposed farther on the image side than a lens group that includes in the anti-vibration lens.

3. The internal focus lens according to claim 1, wherein conditional expression (2) 0.88<|fvr|/f<1.55 is satisfied, where fvr is the focal length of the anti-vibration lens and f is the focal length of the entire optical system.

4. The internal focus lens according to claim 1, wherein conditional expression (3) 0.48<|f3|/f<0.86 is satisfied, where f3 is the focal length of the third lens group and f is the focal length of the entire optical system.

* * * * *